US007625492B2

(12) United States Patent
Jin et al.

(10) Patent No.: US 7,625,492 B2

(45) **Date of Patent: *Dec. 1, 2009**

(54) CHARGE-BASED WATER FILTRATION SYSTEMS

(75) Inventors: Song Jin, Laramie, WY (US); Terry H. Brown, Fort Collins, CO (US); Youwen You, Newark, DE (US); George F. Vance, Laramie, WY (US)

(73) Assignee: The University of Wyoming Research Corporation, Laramie, WY (US)

(*) Notice: Subject to any disclaimer, the term of this patent is extended or adjusted under 35 U.S.C. 154(b) by 541 days.

This patent is subject to a terminal disclaimer.

(21) Appl. No.: 10/544,303

(22) PCT Filed: Jan. 28, 2004

(86) PCT No.: PCT/US2004/002373

§ 371 (c)(1), (2), (4) Date: Jul. 28, 2005

(87) PCT Pub. No.: WO2005/012194

PCT Pub. Date: Feb. 10, 2005

(65) Prior Publication Data

US 2006/0070952 A1 Apr. 6, 2006

Related U.S. Application Data

(60) Provisional application No. 60/443,548, filed on Jan. 28, 2003.

(51) Int. Cl.
*B01D 15/00* (2006.01)

(52) U.S. Cl. ....................... 210/638; 210/679; 210/683; 210/685; 210/691; 210/748; 210/764; 204/518; 204/520; 204/554

(58) Field of Classification Search .............. 210/502.1, 210/503, 505, 660, 663, 669, 679–681, 683, 210/685, 691–693, 638, 748, 764; 204/518, 204/520, 554

See application file for complete search history.

(56) References Cited

U.S. PATENT DOCUMENTS 4,174,277 A * 11/1979 Melnick et al. ............. 210/679
4,458,030 A 7/1984 Manabe et al.

(Continued)

FOREIGN PATENT DOCUMENTS

JP 2000086694 3/2000

(Continued)

OTHER PUBLICATIONS

U.S. Appl. No. 10/544,068, Interview Summary dated Aug. 4, 2008.

(Continued)

*Primary Examiner*—Joseph W Drodge
(74) *Attorney, Agent, or Firm*—Santangelo Law Offices, P.C.

(57) ABSTRACT

Generally, systems for air and water purification using unpowered charged sorbent mediums (3) which may include layered double hydroxide (LDH) (1) compositions, lignin (2), and methods of sorbing inorganic or organic material(s) onto such mediums, including anionic contaminants (10), cationic contaminants (11), non ionic organic contaminants (20), and even biological agents (7) such as bacteria or viruses present in liquids or gases.

38 Claims, 17 Drawing Sheets

7
1
18
19
23
3

U.S. PATENT DOCUMENTS

| | | | | |
|---|---|---|---|---|
| 4,511,710 | A | 4/1985 | Wang et al. | |
| 4,642,193 | A | 2/1987 | Miyata et al. | |
| 4,752,397 | A | 6/1988 | Sood | |
| 4,866,019 | A | 9/1989 | van Broekhoven | |
| 4,983,265 | A * | 1/1991 | Maruyama | 204/269 |
| 5,079,203 | A | 1/1992 | Pinnavaia et al. | |
| 5,110,733 | A * | 5/1992 | Kim et al. | 435/183 |
| 5,114,898 | A | 5/1992 | Pinnavaia et al. | |
| 5,116,587 | A | 5/1992 | Pinnavaia et al. | |
| 5,149,435 | A * | 9/1992 | Laube | 210/651 |
| 5,269,921 | A | 12/1993 | Ruger et al. | |
| 5,358,701 | A | 10/1994 | Pinnavaia et al. | |
| 5,401,446 | A | 3/1995 | Tsai et al. | |
| 5,478,377 | A | 12/1995 | Scavnicky et al. | |
| 5,539,135 | A | 7/1996 | Breuer et al. | |
| 5,718,827 | A | 2/1998 | Rydell et al. | |
| 5,765,556 | A | 6/1998 | Brunson | |
| 5,785,938 | A | 7/1998 | Pinnavaia et al. | |
| 5,888,274 | A | 3/1999 | Frederick | |
| 5,906,677 | A | 5/1999 | Dudley | |
| 5,928,496 | A | 7/1999 | Albers et al. | |
| 6,055,982 | A | 5/2000 | Brunson et al. | |
| 6,329,515 | B1 * | 12/2001 | Choy et al. | 536/23.1 |
| 6,365,661 | B1 | 4/2002 | Fischer et al. | |
| 6,372,837 | B1 | 4/2002 | Fischer et al. | |
| 6,479,024 | B1 | 11/2002 | O'Hare et al. | |
| 6,524,372 | B1 | 2/2003 | Corriu et al. | |
| 6,656,382 | B1 | 12/2003 | Kuhlmann et al. | |
| 6,712,977 | B1 * | 3/2004 | Okaue | 210/688 |
| 6,811,703 | B2 | 11/2004 | Elliott | |
| 7,156,897 | B2 | 1/2007 | Wen | |
| 7,419,601 | B2 | 9/2008 | Cooper et al. | |
| 2003/0215377 | A1 | 11/2003 | Blonigen et al. | |
| 2006/0075894 | A1 | 4/2006 | Jin et al. | |
| 2006/0107639 | A1 | 5/2006 | Hamlin et al. | |
| 2006/0144227 | A1 | 7/2006 | White et al. | |
| 2007/0068391 | A1 | 3/2007 | Weiner | |

FOREIGN PATENT DOCUMENTS

| | | |
|---|---|---|
| WO | WO 92/17405 | 10/1992 |
| WO | WO 99/17879 | 4/1999 |
| WO | WO 00/09599 | 2/2000 |
| WO | WO 2005/012194 A1 | 2/2005 |
| WO | WO 2005/014160 A1 | 2/2005 |

OTHER PUBLICATIONS

U.S. Appl. No. 10/544,068, Office Action dated Mar. 21, 2008.

Brindley, G.W. and S. Kikkawa. 1980. Thermal-behavior of hydrotalcite and of anion-exchanged forms of hydrotalcite. Clays Clay Miner. 28: 87-91.

Cavani, F., F. Trifiro and A. Vaccari, 1991. Hydrotalcite-type anionic clay: Preparation, properties and application. *Catal. Today.* 11:73-301.

Chibwe, M. and T.J. Pinnavaia. 1993. Stabilization of cobalt(II) phthalocyanine oxidation catalyst by intercalation in a layered double hydroxide host. *J. Chem. Soc. Commun.* 278-280

Cervilla, A., E. Llopis, A. Ribera, A. Corma, V. Fornes and F. Rey. 1994. Intercalation of the oxo-transfer molybdenum (VI) complex $[MoO_2\{O_2CC(S)Ph_2\}_2]^{2-}$ into a zinc(II)-aluminium (III) layered double hydroxide host. Catalysis of the air oxidation of thiols. *J. Chem. Soc. Dalton. Trans.* 20:2953-2957.

Constantino, V.R.L. and T.J. Pinnavaia. 1995. Basic properties of $Mg^{2+}{}_{1-x}Al^{3+}{}_x$ layered double hydroxides intercalated by carbonate, hydroxide, chloride, and sulfate anions. *Inorg. Chem.* 34:883-892.

Gerba, C.P. and J. B. Rose. 1990. Viruses in source and drinking water. p. 380-396. In: G.A. McFeters (ed.), Drinking water microbiology. Spinger, NY.

Goswamee, R.L., P. Sengupta, K.G. Bhattacharyya and D.K. Dutta. 1998. Adsorption of Cr(VI) in layered double hydroxides. *Appl. Clay Sci.* 13:21-34.

Hermosin M.C., I. Pavlovic, M.A. Ulibarri and J. Cornejo. 1993. Trichlorophenol adsorption on layered double hydroxide: a potential sorbent. *J. Envir. Sci. Health* A28:1875-1888.

IPRP for International Application No. PCT/US2004/02373, Feb. 23, 2005.

Itaya, K., H.C. Chang and I. Uchida. 1987. Anion-exchange hydrotalcite-like-clay-modified electrodes. Inorg. Chem. 26:624-626.

Kang M.J., K.S. Chun, S.W. Rhee and Y. Do. 1999. Comparison of sorption behavior of $I^-$ and $TcO_4^-$ on Mg/A1 layered double hydroxide. *Radiochim. Acta.* 85:57-63.

Kang, M.J., S.W. Rhee and H. Moon. 1996. Sorption of $MO_4^-$(M=Tc, Re) on Mg/A1 layered double hydroxide by anion exchange. *Radiochimica Acta.* 75:169-173.

Lal, M. and Howe, A.T., "Studies of zinc-chromium hydroxy salts. II. Composite anion conductors of pressed disks of $[Zn_2Cr(OH)_6]X$ $nH_2O$, Where $X^-=F^-$, $Cl^-$, $Br^-$, $I^-$, $NO_3^-$, and $1/2CO_3^{2-}$.", J. Solid State Chem (1983).

Martin, K.J. and T.J. Pinnavaia. 1986. Layered double hydroxide as suppor anionic reagent. Halide ion reactivity in $[Zn_2Cr(OH)_6]X$ $nH_2O$. *J. Am. Chem. Soc.*108:541-542.

Miyata, S., 1975. The sytheses of hydrotalcite-like compounds and their structures and physico-chemical properties—I: The system $Mg^{2+}$-$Al^{3+}$-$NO_3^-$, $Mg^{2+}$-$Al^{3+}$-$Cl^-$, $Mg^{2+}$-$Al^{3+}$-$ClO_4^-$, $Ni^{2+}$-$Al^{3+}$-$Cl^-$, and $Zn^{2+}$-$Al^{3+}$-$Cl^-$. *Clays Clay Miner.* 23:369-375.

Miyata, S., 1980. Physico-chemical properties of synthetic hydrotalcites in relation to composition. *Clays Clay Miner.* 28:50-55.

Miyata. S., 1983. Anion-exchange properties of hydrotacite-like compounds. *Clays Clay Miner.* 31:305-311.

Park, Y., K. Kuroda and C. Kato. 1990. Direct synthesis of intercalation compounds between a layered double hydroxide and an anionic due. *J. Chem. Soc. Dalton Trans.* 10:3071-3074.

Rhee, S.W., M.J. Kang, H. Kim and C.H. Moon. 1997. Removal of aquatic chromate ion involving rehydration reaction of calcined layered double hydroxide (Mg-A1-$CO_3$). *Environ. Tech.* 18:231-236.

Schmidt, P.C. and K. Beneke. 1988. Untersuchungen zur adsorption und stabilität von konservierungsstoffen in antacidasuspensionen. 2. Mitteilung: Reaktionskinetische stabilitätsuntersuchungen. *Pharm. Acta. Helv.* 63:188-196.

Suzuki, E., M. Okamoto and Y. Ono. 1989. Catalysis by interlayer anions of a synthetic hydrotalcite-like mineral in a halide exchange between organic halides. 1485-1486.

U.S. Environmental Protection Agency. National Primary Drinking Water Regulations: Ground Water Rule; Proposed Rules. 40 CFR Parts 141 (pp. 1-175) and 142 (pp. 1-76), 30194-30274, 2000.

U.S. Appl. No. 60/443,548, filed Jan. 28, 2003, "Layered Double Hydroxides and Use in Removal of Biological Agents from Aqueous Systems", specification 20 pages, drawings 4 sheets.

You, Y.W., H.T. Zhao and G.F. Vance. 2002a. Hybrid organic-inorganic derivatives of layered double hydroxides and dodecylbenzenesulfonate : Preparation and sorption characteristics. *J. Mater. Chem.* 12: 907-912.

You, Y.W., H.T. Zhao and G.F. Vance. 2002b. Surfactant-enhanced adsorption of organic compounds by layered double hydroxides. *Colloids Surface A.* 205: 161-172.

You, Y.W., H.T. Zhao and G.F. Vance. 2002c. Adsorption of dicamba (3,6 dichloro-2-methoxy benzoic acid) in aqueous solution by calcined-layered double hydroxide. *Applied Clay Science.* 21:217-226.

You, Y.W., G.F. Vance and H.T. Zhao. 2001a. Selenium adsorption on Mg-Al and Zn-Al layered double hydroxides. *Appl. Clay. Sci.* 20:13-25.

You, Y.W., H.T. Zhao and G.F. Vance. 200lb. Removal of arsenite from aqueous solution by anionic clays. *Environmental Technology.* 22:1447-1457.

U.S. Appl. No. 10/544,068, Office Action dated Dec. 16, 2008.

U.S. Appl. No. 10/544,068, Office Action dated Mar. 23, 2009.

US National Phase U.S. Appl. No. 10/544,068, Notice of Allowance dated Dec. 16, 2008.

* cited by examiner

CHARGE-BASED WATER FILTRATION SYSTEMS

I. CROSS-REFERENCES TO RELATED APPLICATIONS

This application is the United States National Stage of international application no. PCT/US2004/002373, filed 28 Jan. 2004 which claims the benefit of U.S. Provisional Application No. 60/443,548, filed 28 Jan. 2003, each hereby incorporated by reference.

II. TECHNICAL FIELD

Generally, filtration systems, layered double hydroxide (LDH) compounds and methods of sorbing inorganic or organic material(s) onto such LDH compounds, including biological agents such as bacteria or viruses present in liquids or gases.

III. BACKGROUND

Numerous species of biological agents, including, but not limited to, protozoans parasites, bacteria, fungi, or viruses enter water systems or enter the atmosphere from sources such as solid waste material, commercial processing wastes, sewage effluent, septic tanks effluents, sewage sludge, garbage disposal, urban runoff, medical facilities, agricultural runoff, human beings sneezing or coughing and the like.

Bacteria are well adapted to and are common biological agents in water systems. Bacteria may have ranges in size from about 1000 nanometers (nm) to about 10,000 nm in size and include species such as *Aeromonas, campylobacter, Escherichia coli, Helicobacter pylori, Legionella, Nontuberculosis mycobacteria, Psedomonas aeruginosa, salmonella, shigella, Vibrio vholerae, Yersinia enterocolitica*, and the like bacteria.

Major bacteria identified in ambient air include species such as: *Acinetobacter, Ordetella perfussis, Corynebacteria diphtheria, Mycobacterium avium, Pseudomonas aeruginosa, Staphylococcus aureus*, and the like bacteria.

Viruses have been detected in all environments including water systems as described by Gerba, C. P. and Rose, J. B., "Viruses in Source and Drinking Water", Drinking Water Microbiology (1990), incorporated by reference herein, and in ambient air. Most viruses are small (about 20 nm to about 200 nm) and consist of nucleic acid encapsulated in protein molecules. In municipal sewage, more than 100 different viruses may be identified, and viruses such as poliovirus, hepatitis A, echo, coxsackie, rota, adeno, or Norwalk-like viruses are virulently hazardous at very low concentrations. In ambient air, viruses such as adenovirus, coronavirus, echovirus, influenza, and rhinovirus have been widely detected.

Because the occurrence of pathogenic biological agents in water and air systems constitutes a serious threat to human health and can be the source of a variety of diseases, such as gastroenteritis, cholera, hepatitis, typhoid fever, giardiasis, or the like, the United States Environmental Protection Agency is in the process of addressing the public health risk resulting from pathogenic contamination of water systems.

However, the use of conventional large-scale water purification technologies such as ultraviolet irradiation or chlorination may allow concentrations of pathogenic biological agents to survive. As such, secondary treatment of conventionally treated water may be necessary to completely capture or remove biological agents in water systems. In addition, these technologies are largely not available in rural areas, military operations, tourism sites, etc. Under such circumstances, portable apparatus with low or no power requirements are in need to remove bioagents from the water systems.

To meet the demand for secondary treatment technology, including, but not limited to, commercial or residential secondary water treatment, a variety of distillation, reverse osmosis, and filtration systems have been developed which utilize evaporation, activated carbon, ion exchange resins, or reverse osmosis membranes to further purify water. However, even though these conventional technologies can be effective in the removal of certain organic compounds, and certain metals, such as lead and mercury, a variety of problems remain yet to be addressed with respect to both primary and secondary treatment methods.

A significant problem with conventional water treatment technology can be that loading capacity of activated carbon or ion exchange resins, or the like, can be low requiring frequent changes or requiring the frequent use of reactivation procedures to maintain water quality. Similarly, reverse osmosis membranes may not be suitable for purification of water with high levels of dissolved solids because the reverse osmosis membrane can become saturated or clogged with solids resulting in reduced efficiency.

Another significant problem with conventional water treatment technology can be that the amount of water processed may be low. Conventional evaporation technology and reverse osmosis technology are typically suitable only for those applications in which small volumes of water are to be purified, such as in the residential setting to purify drinking water. In addition, the energy and pressurizing requirements of reverse osmosis treatment further limit its use.

Another significant problem with conventional water treatment technology can be that sorbent materials used in conventional water treatment may possess a neutral or negatively charged surface. While some biological agents may nonspecifically interact with neutral or negatively charged sorbents, the low binding efficiency excludes the use of these sorbents to attract, capture, collect, or remove biological-agents from water systems.

These problems with conventional water treatment technology coupled with the increasing concerns over pathogenic microbial contamination of drinking water, and especially in view of recent concerns over the use of biological agents as weapons, warrant the imminent development of a cost-effective water treatment technology that can be readily applied to remove biological agents from water systems.

Moreover significant problems remain unresolved with regard to conventional air or gas treatment technology. Prominent among these problems may be that conventional gas filtration systems may only remove relatively large particulates such as pollen while allowing pathogenic agents such as viruses to pass through without retention to the filter material.

The instant invention addresses each of these concerns with respect to attracting, capturing, inactivating, or removing metal ions, inorganic and organic compounds, or biological agents from aqueous systems or gas systems whether the treatment is primary or secondary.

On the basis of their structure and properties, specific applications for layered double hydroxide (LDH) compounds and compositions have been previously identified. These include the use of LDH compounds as catalysts and catalyst precursors, as antacids, as solid ionic conductors, in preparation of pigments, to interact with anionic contaminants such as $Cr_2O_7^{2-}$, trichlorophenol (TCP), and to interact with radioactive anionic pollutants $TcO_4^-$, $ReO_4^-$ and $I^-$.

IV. DISCLOSURE OF THE INVENTION

Accordingly, a significant objective of the invention is to provide materials that, individually or in combination, interact with, capture, sorb, inactivate, or exchange a wide variety of materials in water or gas such as metal ions, inorganic compounds, organic compounds, biological agents, or the like materials.

Another significant object of the invention can be to provide layered double hydroxide compounds to treat water or gas by sorbing, absorbing, adsorbing, interacting with, attracting, sequestering, capturing, deactivating, or removing bacteria, including, but not limited to bacteria in the group consisting of: *Acinetobacter, Aeromonas, Campylobacter, Corynebacteria diphtheria, Escherichia coli, Helicobacter pylori, Legionella, Mycobacterium avium, Nontuberculosis mycobacteria, Ordetella perfussis, Psedomonas aeruginosa, Salmonella, Sshigella, Staphylococcus aureus, Vibrio vholerae*, and *Yersinia* and other opportunistic bacteria.

Another significant object of the invention can be to provide layered double hydroxide compounds to treat water or gas by sorbing, absorbing, adsorbing, interacting with, attracting, sequestering, capturing, deactivating, or removing viruses, including, but not limited to viruses in the group consisting of: Adenovirus, Coronavirus, Coxsackievirus, Echovirus, Enteroviruses, Hepatitis virus, Influenza, Norwalk-like virus, Poliovirus, Reovirus, Rotovirus, Toravirus, and the like viruses.

Another significant object of the invention can be to provide layered double hydroxide compounds that exhibit positively charged surface areas or regions which can interact with negatively charged surface areas or regions of biological agents to attract, sorb, absorb, adsorb, sequester, capture, or remove them from water or air systems.

Another significant object of the invention can be to provide layered double hydroxide compounds having intercalated ions of sufficient size to maintain or orient the sheets of the layered double hydroxide compounds a sufficient distance apart to allow or optimize interaction of the positively charged surfaces of layered double hydroxide compound with the numerous and varied biological agents, or materials, to be attracted, sorbed, absorbed, adsorbed, captured, sequestered, or removed from water or air systems.

Another significant object of the invention can be to provide layered double hydroxide compounds for the removal of, both pathogenic biological agents and toxic anionic trace elements, including, but not limited to, arsenic or selenium, independently or at the same time.

Another significant object of the invention can be to provide layered double hydroxide compounds which attract, sorb, absorb, adsorb, sequester, capture, or remove pathogenic biological agents and toxic anionic compounds from water systems at same time.

Another significant object of the invention can be to provide layered double hydroxide compounds for the removal of, both pathogenic and nonpathogenic biological agents and anions, including, but not limited to, phosphate, sulfate, and carbonate.

Another significant object of the invention can be to provide layered double hydroxide compounds (which exhibit positively charged surface areas or regions) attached to materials having negatively charged surface areas or regions whereby the presentation of both the positively charged surface of the layered double hydroxide in combination with the negatively charged surface of the attached material can attract, sorb, absorb, adsorb, capture, sequester, exchange, or remove materials (including mixtures of metal oxides and biological agents) in fluids that have either positively charged surface areas or regions or negatively charged surface areas or regions, or both.

Another significant object of the invention can be to provide layered double hydroxide-lignin compounds for the removal of, individually or in combination, biological agents or metals from liquids.

Another significant object of the invention can be to provide layered double hydroxide-lignin compounds for the removal of, individually or in combination, biological agents or metals from gases.

Another significant object of the invention can be to provide layered double hydroxide compounds that can be calcined to reactivate the layered double hydroxide compound, or destroy or deactivate the sorbed biological agents after use.

Another significant object of the invention can be to provide layered double hydroxide compounds that can be dissolved in acid solution and resynthesized by coprecipitation method(s) for recycle use after being first used for removing biological agents from water systems or gas systems.

Another significant object of the invention can be to provide water treatment apparatus including, but not limited to, batch process containers, flow through containers, columns, bags, tubes, or the like, whether disposable or reusable, filled with one or more layered double hydroxide compounds or one or more layered double hydroxides bound, attached, or coating support or carrier materials such as filters, membranes, or particles, to be used as water treatment apparatus for the removal of particulate, metals, inorganic compounds, organic compounds, or biological agents from water. The water treatment apparatus can be sized or configured to the particular application, the amount of water to be processed, and the location at which the water is processed.

Another significant object of the invention can be to provide water treatment apparatus for residential use configured to attach to or adapt to existing residential plumbing or water inlet or outlet fixtures to treat residential water by removal of metal, inorganic compounds, organic compounds, or biological agents.

Another significant object of the invention can be to provide easy-carry water treatment apparatus for United States army or military in the field to treat field water by removal of metal, inorganic compounds, organic compounds, or biological agents and obtain potable water.

Another significant object of the invention can be to provide fluid filtration systems that can be used for emergency response efforts to treat contaminated water or air.

Another significant object of the invention can be to provide layered double hydroxide compounds to biological scientists and environmental engineers to concentrate biological agents, including, but not limited to, bacteria and viruses, from liquid and gas samples.

Another significant object of the invention is to provide portable water or air treatment apparatus for military or other purposes which is discrete or can be combined with existing water or air treatment apparatus for use in the field.

Another significant object of the invention can be to provide layered double hydroxide compounds connected, attached or otherwise coated to a membrane or filter surface to collect or concentrate biological agents, such as bacteria, viruses, prions, proteins, nucleic acids, or other biological agents, components, or molecules in liquids. The biological agents collected or concentrated by the layered double hydroxide compound can serve as samples for qualification or quantification or otherwise analyzed to detect, identify, and characterize the collected biological agents.

Yet another object of the invention can be to provide gas treatment apparatus in batch process containers, flow through containers, columns, tubes, or the like, whether disposable or reusable, filled with one or more layered double hydroxide compounds or one or more layered double hydroxides bound, attached, or coating support or carrier materials such as filters, membranes, or particles, to be used to purify gases, or purify air or other partial pressures of gases, or otherwise treat gas by removal of particulate, metals, inorganic compounds, organic compounds, or biological agents. Specifically, layered double hydroxide compounds, including, but not limited to, layered double hydroxide-lignin compounds can be used to remove potential pathogens in the air delivered to residential or commercial buildings.

Naturally, further independent objects of the invention are disclosed throughout other areas of the specification.

V. BRIEF DESCRIPTION OF THE DRAWINGS

VI. MODE(S) FOR CARRYING OUT THE INVENTION

Figure 1:
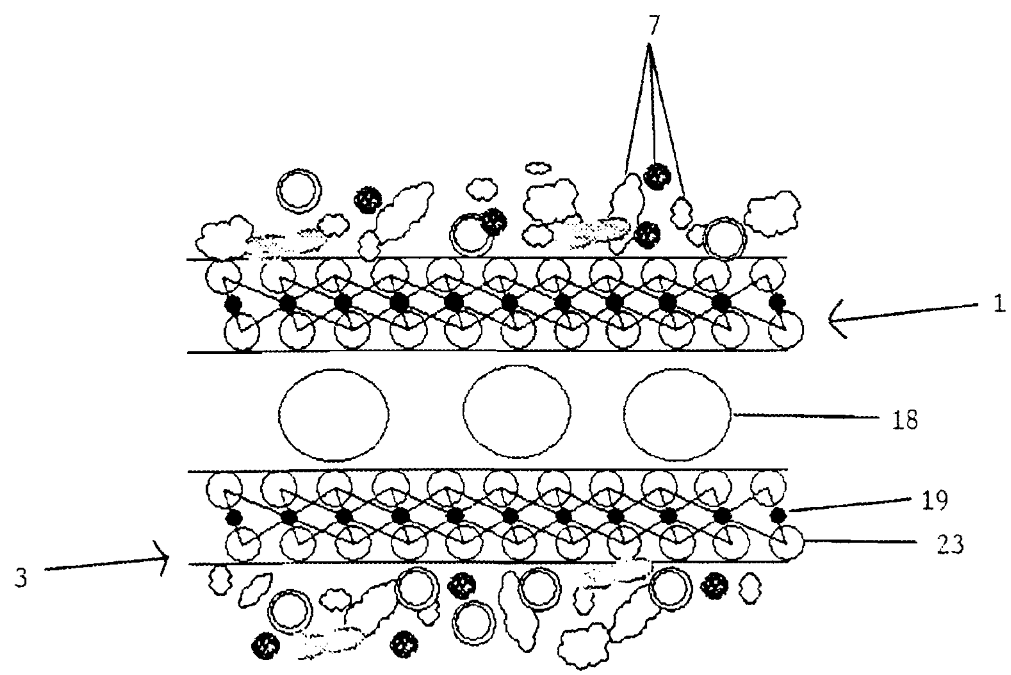
FIG. 1 is an embodiment of the present invention for impurity sorption.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should further be understood to support and encompass descriptions and claims of all the various embodiments, systems, techniques, methods, devices, and applications with any number of the disclosed elements, with each element alone, and also with any and all various permutations and combinations of all elements in this or any subsequent application.

Generally, the present invention may provide a system for removal of impurities from any type of fluid. Impurities may include contaminants, pollutants, or any type of undesired component that may be found in fluids. A fluid (40) may include any substance that is capable flowing, such as but not limited to liquid, gas, water, air, or the like. In some embodiments, the present invention may include establishing a fluid (40) which may include containing air or water in some sort of container, providing some type of indoor or enclosed area for air or water, providing air or water from outdoors, among others.

Water may be used from a stream, any type of plumbing system, faucet, or any water source and air may be used from the outdoors, indoors, buildings, vehicles, and the like. Water may include raw water or even primarily treated water. Raw water is to be understood as any water that is in a natural, uncultivated, or even unrefined state, it may be untreated water, or may be water from a river, ocean, stream, rain, and the like water sources. Primarily treated water may include water which may have been previously filtered, for example, water as received in a home or office, which may have gone through a municipal filtration system, such as water found in a residential or commercial building or the like.

A fluid (40) may contain impurities that may be desired to be removed before a human, animal or the like consumes or may be exposed to those contaminants—possibly for the prevention of an illness. In some embodiments, the present invention may include the removal of nanostructural components from fluids. A nanostructural component may be any structure that is very small, minute, not visible or detectable by the eye, or the like.

In fluids, different types of impurities or contaminants may exist. For example, fluids may contain a first, second and third components, among others. A first component (4) may include any substance, chemical, or compound found in a fluid and may even include an anionic substance, such as but not limited to, an anionic contaminant (8), a biological agent, arsenic, selenium, dicamba, anionic surfactant, virus, bacteria, hormone, fungi, prions, proteins, nucleic acids, phosphate, sulfate, carbonate, MS2 virus, Phi-X 174, *Escherichia coli strains, Pseudomonas arugenosa*, and the like contaminants. A second component (5) may include any substance, chemical, or compound found in a fluid and may even include a cationic contaminant, lead, chromium, zinc, mercury, ammonium, sodium, calcium, iron, copper, and the like contaminants. A third component (6) may include any substance, chemical, or compound found in a fluid and may even include substances that are not anionic nor cationic that may exist in a fluid, such as but not limited to non-ionic organic contaminants (20), 1,2,4-trichlorobenzene, 1,1,1-trichloroethane, trichloroethylene, tetrachloroethylene, and the like contaminants. A bioagent may include any type of living organism, such as but not limited to virus, bacteria, hormone, fungi, MS2 virus, Phi-X 174, *Escherichia coli strains, Pseudomonas arugenosa*, and the like bioagents.

To remove various impurities or contaminants from fluids, the present invention may include providing an unpowered charged sorbent medium (3), shown in FIG. 1. Previous attempts for filtration may include various types of filters that may be connected to a power source, such as a plug, battery, or the like, in order to create an electrostatic charge. Here, the present invention may include a medium that may not be connected to any sort of power source, yet contains a charge, either or both negative and positive, and which may be capable of sorbing various impurities. A sorbent may be any substance, compound, composition, chemical, or the like which can gather other substances and even gather other substances on a surface. Other substances may include impurities, contaminants and the like. Sorption of an impurity may include any kind of taking and holding of an impurity, possibly by absorption or adsorption.

A medium may include an intervening substance and may even include any type of porous support mediums which may be permeable by fluid, water, air, and the like and which holds or bears some sort of sorbent element. Mediums may include any substance that can be used for filtration or purification of fluids, such as but not limited to filter paper, plan paper, special paper fibers, cloth, fabric, water insoluble substances, coated particles, coating support, carrier materials and the like.

Figure 2:
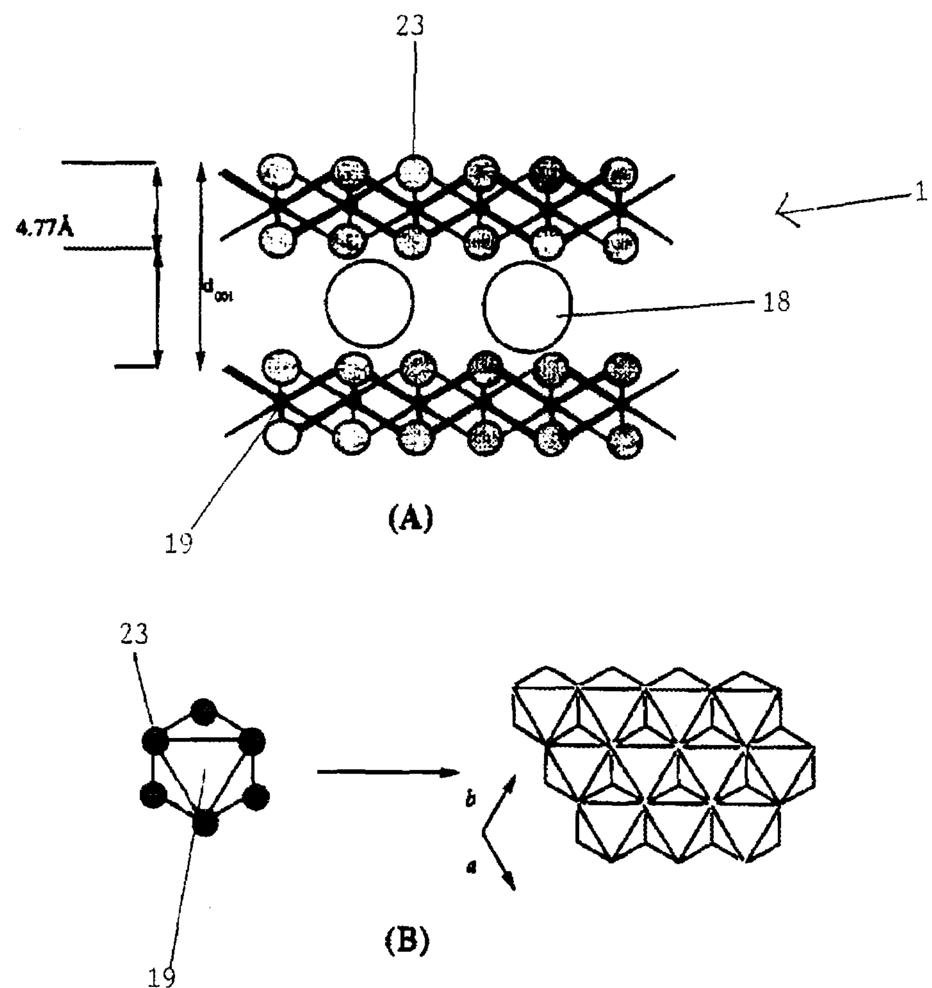
FIG. 2 is a generic structure of layered double hydroxides in an embodiment of the present invention.
Figure 4:
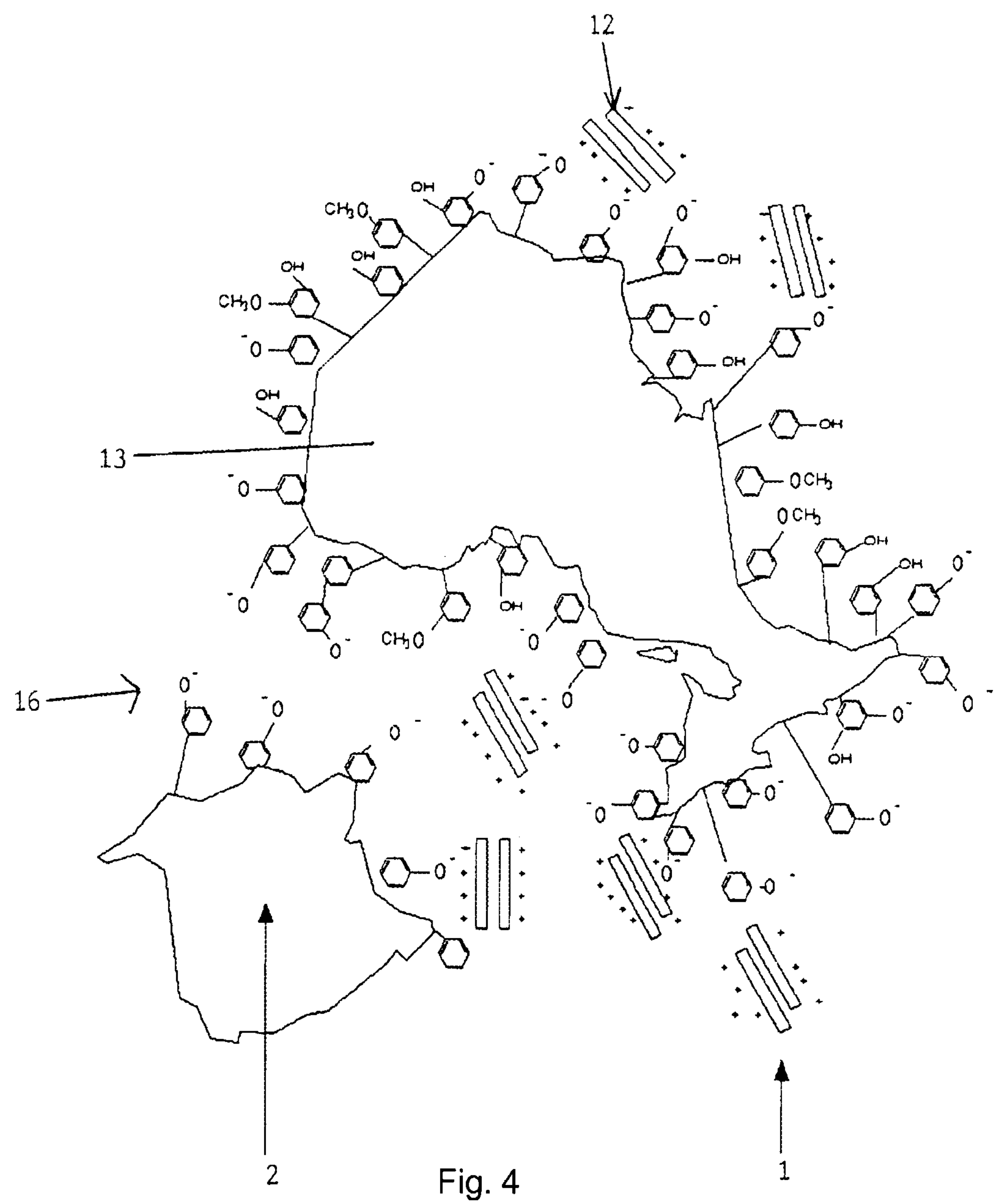
FIG. 4 shows certain embodiments of the invention for layered double hydroxide-lignin compounds.

An unpowered charged sorbent medium (3) may include a layered double hydroxide ("LDH") composition (1) which may contain a net positive charge as shown in FIG. 4. In embodiments, the present invention may include containing LDH compositions. Referring primarily to FIGS. 1 and 2, LDH (1) compounds are stacked positively charged octahedral sheets having a general formula of:

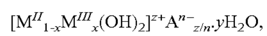

$$[M^{II}_{1-x}M^{III}_{x}(OH)_2]^{z+}A^{n-}_{z/n}.yH_2O,$$

wherein $M^{II}$ and $M^{III}$ are bivalent and trivalent cations in octahedral positions and $A^{n-}$ are anions intercalcated with the octahedral sheets or anions bound in an intermediate layer. The interlayer spacing of the octahedral sheets can vary depending on the size and geometrical structure of the intercalated anions. The net positive charge on the surface of LDH compounds may be due to the isomorphic substitution of trivalent metals by divalent metals and this positive charge on the surface of LDH compound may be balanced by the intercalated anions. Due to their structure, LDH compounds can exhibit relatively large surface areas (0.02-0.12 $km^2$/kg) and high anion exchange capacities (200-500 cmol/kg). LDH compounds also can exhibit high pH buffering capacities and are relatively stable under a wide range of pH values. Thermal stability of LDH compounds may be dependent on the intercalcated anions and LDH compounds can may maintain their layered structure at temperatures under about 250° C.

Figure 3:
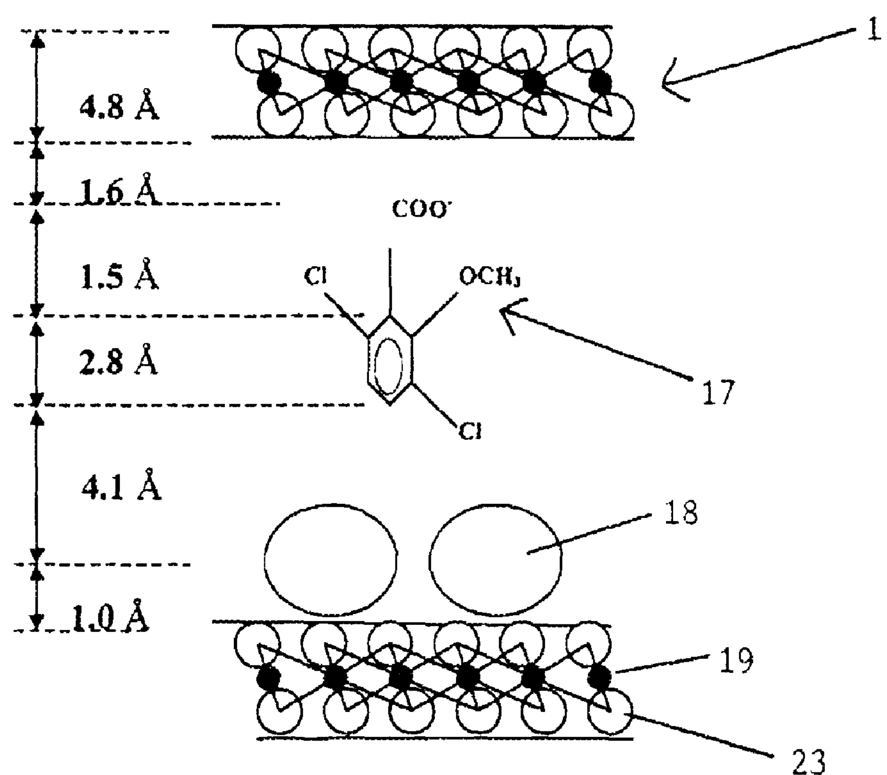
FIG. 3 shows certain embodiments of the invention for layered double hydroxide compounds that can sorb certain inorganic or organic material(s).

As shown in FIGS. 1, 2, and 3 a layered double hydroxide composition (1) may include interlayer anions (18), divalent and trivalent cations (19) and hydroxide (23). In embodiments, $M^{II}$ may include divalent cations such as but not limited to $Ca^{2+}$, $Mg^{2+}$, $Zn^{2+}$, $Co^{2+}$, $Ni^{2+}$, $Cu^{2+}$, $Mn^{2+}$, and the like cations. $M^{III}$ may include trivalent cations such as but not limited to $Al^{3+}$, $Cr^{3+}$, $Fe^{3+}$, $Co^{3+}$, $Mn^{3+}$, and the like cations. $A^{n-}$ may include interlayer anions such as but not limited to $Cl^-$, $NO_3^-$, $ClO_4^-$, $CO_3^{2-}$, $SO_4^{2-}$, and the like interlayer anions. X may include a numerical number which can be, but is not limited to any number between about 0.1 to about 0.3. Of course, this number may vary. The number may determine the LDH anionic exchange capacity, which may also determine the removal ability of LDH. LDH compounds can be synthesized by coprecipitation of a solution of bivalent and trivalent metal salts with a base such as sodium hydroxide or potassium hydroxide, as known to those skilled in the art.

Referring to FIG. 4, embodiments of the invention can include containing an amount of lignin (2) or even a lignin-dominant substance. An unpowered charged sorbent medium (3) may include lignin. Lignin may be used, in embodiments, as a pure substance or may be combined with other substances to create a lignin-dominated substance. A lignin-dominated substance may include any lignin-dominant waste, such as dried solids of "black liquor" (waste stream from paper industry), biowaste which may include, but it not limited to corn stalks, rice grains, and the like. Lignin (2) may be physically mixed with LDH or LDH can be precipitated on a lignin surface during the synthesis. Lignin is one of the most abundant biomass components on the planet and a numerous and wide variety of lignin compounds can be obtained through synthesis.

Lignin compounds generally carry negative charges on its surface, which offer numerous binding sites for cationic contaminants (9), positively charged compounds or even metals or the like. For example, toxic metals having ionic forms with positive charges are often present in water systems. Lignin compounds can remove about 99.9% of these metals from the aqueous phase. The combination of lignin (2) with LDH compounds can possess the affinity to both negatively charged contaminants as discussed above and to positively charged contaminants. Understandably, a lignin and LDH compound can be useful in attracting, collecting, sequestering, retaining, or removing either positively charged ions or negatively charged contaminants, individually or simultaneously.

In embodiments, the present invention may include moving at least some of a fluid in the vicinity of a sorbent or a medium having sorbents. Sorbents may include an anionic contaminant sorbent, a cationic contaminant sorbent (11), LDH composition, anionic compositions (13), cationic compositions (12), lignin, or any substance capable of sorbing. A movement may include a flow or current of any type including but not limited to physically moving a fluid, osmosis, mechanically moving a fluid, or the like fluid flow. A circulation element (50) may be used for a mechanical movement and may even be used to drive or force fluid movement, such as but not limited to an air blower, air conditioner, water or air pump, fan, an electronic apparatus, or any device for producing a current of fluid by movement of the device. Physically moving a fluid may include any type of movement made by a user or occurring naturally such as but not limited to stirring, breathing, wind, pouring water, river flow and the like.

As a fluid is moving, it may be near or in the proximity of a sorbent. Of course, not all of a fluid may be in the vicinity of a sorbent, but at least some of a fluid may get close enough to allow attraction of certain types of molecules to the sorbent. A fluid may pass through a medium and some fluid components may be prevented from moving through a medium due to the porous nature of a medium. For example, even without attraction, relatively larger substances may not pass through pores in a medium because of their size. Yet, smaller substances may fit through the pores and pass through a medium.

Accordingly, to remove a variety of impurities from fluids, the present invention, in embodiments, may provide attracting impurities to a charged component or sorbent. As previously discussed, impurities or contaminants may include first, second and third components, anionic contaminants, cationic contaminants, non-ionic organic contaminants and even biological agents. Anionic components having a net negative charge and even cationic compositions (12) having a net positive charge may be provided. By attraction, an impurity may be drawn by a physical force causing or tending to cause an impurity to approach, adhere, or unite to a charged component. This may include, but is not limited to the interactions between oppositely charged substances such as ionic interactions between a cation and an anion.

In embodiments, a dual sorbent medium may be provided in which any type of medium may sorb at least two types of contaminants. This may include an anionic component (13) and a cationic composition (12). Cationic composition (12) may include layered double hydroxide compositions. Layered double hydroxides may include an anionic contaminant sorbent (10) due to the attraction of anions. Anionic components (13) may include lignin. Lignin may include a cationic contaminant sorbent due to the attraction of cations.

Figure 7:
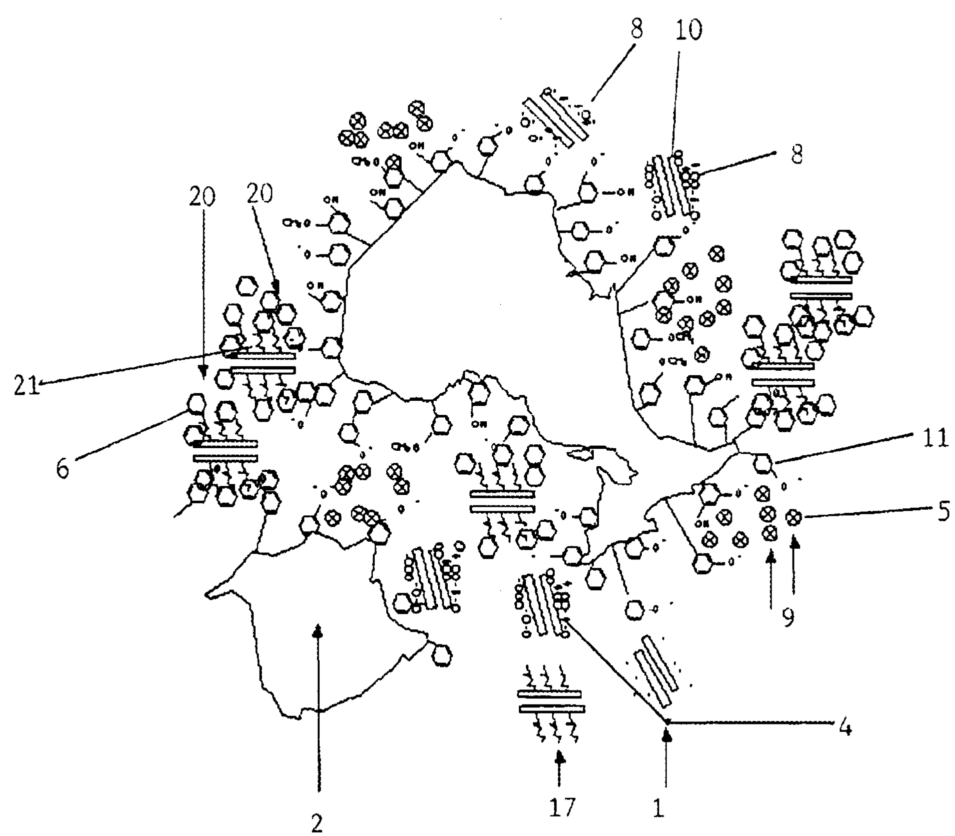
FIG. 7 shows certain embodiments of the invention which comprise layered double hydroxide and lignin and organic compounds.

In other embodiments, the present invention may include sorbing at least some impurities to a component or sorbent. This may include, in various embodiments and as shown in FIG. 7 sorbing a first component (4) on an anionic component (13), sorbing a second component (5) on a cationic composition (12), sorbing a third component (6) on an organic component, sorbing an anionic contaminant (8) on LDH (1), sorbing cationic contaminants (9) on lignin (2), sorbing non-ionic organic contaminants (20) on organic components (17), sorbing biological agents on a unpowered sorbent medium and the like. Sorbing may include gathering or binding impurities to a component perhaps by absorption or adsorption or a combination of the two processes, as known to those skilled in the art. Of course, some impurities or contaminants may not be sorbed. An impurity may be sorbed on a surface of a component, such as LDH as shown in FIG. 1.

After a fluid has been in some contact with a sorbent component, the present invention may provide moving a fluid with at least some reduction (42) of an impurity. This may be further illustrated in FIGS. 5, 6 and 8 where the fluid may be passed through some sort of filter and as it exits the filter or perhaps even as the fluid moves away from a filter (43) or purification apparatus, the fluid may be in a state of depletion of impurities. A fluid may have less impurities or contaminants then were originally present.

In certain embodiments, the present invention may include providing layered double hydroxide composition and containing an amount of LDH. This may include containing LDH in any way, and even a filtering device whether it be for air or water filtration. The present invention may even include any type of medium that can hold LDH particles or solutions. Depending on how much fluid that may be desired to be filtered, an amount of LDH may be contained.

In embodiments, the present invention may include an anionic contaminant sorbent (10) which may include any type of sorbent that can sorb anionic contaminants (8). Accordingly, an anionic contaminant sorbent may include sorbing of inorganic and organic anionic contaminants. Some inorganic contaminants may include $Cl^-$, $NO_3^-$, $ClO_4^-$, $CO_3^{2-}$, $SO_4^{2-}$, $CrO_4^{2-}$, $I^-$, $SeO_3^{2-}$, $SeO_4^{2-}$, As(III) as well as other anionic inorganic substances. Some organic contaminants may include trichlorophenol (TCP), trinitrophenol (TNP), 2,4-dichlorophenoxyacetic acid (2,4-D), 3,6 dichloro-2-methoxy benzoic acid (dicamba), octylsulfate (SOS), sodium dodecylsulfate (SDS), sodium 4-octylbenzenesulfonate (SOBS), sodium dodecylbenzenesulfonate (SDBS), as well as other cationic organic substances. Anionic contaminant sorbents (10) may also sorb biological agents (7) such as viruses, bacteria, and the like. Some examples of these may include MS2, Phi-x 174, *E coli*, $SO_2$, $NO_x$, $H_2S$, phenolic compounds, and other anionic organic vapors. Due to the number of different bacteria, any type of bacteria may be included and thus may be sorbed onto an anionic contaminant sorbent.

Certain embodiments of the invention comprise LDH compounds that can remove inorganic and organic material(s) from aqueous systems. For example, various LDH compounds and calcined-LDH compounds in accordance with the invention can be synthesized and used to sorb anionic selenium, arsenic, or dicamba (3,6 dichloro-2-methoxy benzoic acid), and other inorganic and organic materials.

In embodiments, biological agents may be substantially sorbed on a surface of layered double hydroxide composition, as shown in FIG. 1. At least some of the anionic contaminants may sorb on a surface of LDH, as shown in FIG. 1. This may occur due to the pore size on the surface of the LDH. Some anionic contaminants may be larger than the pore size of the LDH and may be sorbed on the surface of the LDH. Of course, some contaminants may fit through the pores and may even be sorbed in the intermediate layer of an LDH composition. The larger anionic contaminants may remain sorbed to the surface of the LDH compound and these larger contaminants may include, but is not limited to viruses, fungi and any other large substances, bioagents, or compounds.

By substantially sorbed it is to be understood that LDH has a certain number of sites that it can sorb various anionic contaminants. At some point, the LDH surface may become full or mostly full of anionic contaminants and can no longer attract and sorb additional biological agents (7). A filter having LDH may be saturated when all or most of the LDH sorbing sites may be occupied by bioagents therefore no further sorption could occur. At this point, the LDH may need to be removed from a filtration system and replaced with either new unsorbed LDH or even re-activated LDH. The lifespan for a filter may be calculated by the per unit sorbing capacity of LDH to certain bioagents. For example, for bacteria, typically 1 gram of LDH can sorb 10^8 bacteria. If it is determined that there are 10^16 bacteria in certain volume of pretreated medium, 2 grams of LDH could be the minimal requirement. To be conservative, a filter may be changed at about 60% to about 75% full. A percentage sorbent value may represent the amount of bioagents sorbed on a medium such as a filter having LDH. While this may include any percentage value, such possibilities may include:

about 60%;

about 75%;

about 85%; and about 95%.

Other values are certainly possible and all should be understood as represented within the scope of this invention.

The present invention may include, in embodiments, chemically associating LDH and lignin. In embodiments, a chemical mixture (16) may include an anionic component (11) and a cationic component (12) and may even include LDH (1) and lignin (2). A chemical mixture (16) may include an aggregate of two or more substances that are chemically united. A chemical association may include, but is not limited to ionic bonding, covalent bonding, tether molecule, hydrophobic interaction, and the like as known to those skilled in the art. In other embodiments, LDH and lignin may be mixed where they are not chemically united and may even exist in no fixed proportion to each other.

LDH compounds, as described above, or otherwise described or synthesized, can be associated directly with lignin through ion bonding, or can be associated with lignin through a tether molecule attached to lignin that presents a region sufficiently negatively charged to generate an ionic bond or covalent bond with LDH compound(s). LDH may be tethered to lignin with a variety of tether or linking molecules that may generate covalent bonds between the tether and lignin or between the tether and LDH compound(s) or both, or LDH compounds may become associated with lignin by hydrophobic interaction, or the like. A wide variety of linking or tether molecules could be used to associate LDH compounds with lignin. The tether molecules could be selected on the basis of length, reactive groups, hydrophilicity, resistance to degradation, or the like. Understandably, numerous permutations and combinations of lignin-LDH, or lignin-tether-LDH, can be generated. Each LDH, organo-LDH, lignin-LDH, or lignin-tether-LDH can be used in accordance with the invention to interact with, sequester, sorb, inactive, or remove biological agents from various types of aqueous systems.

Figure 5:
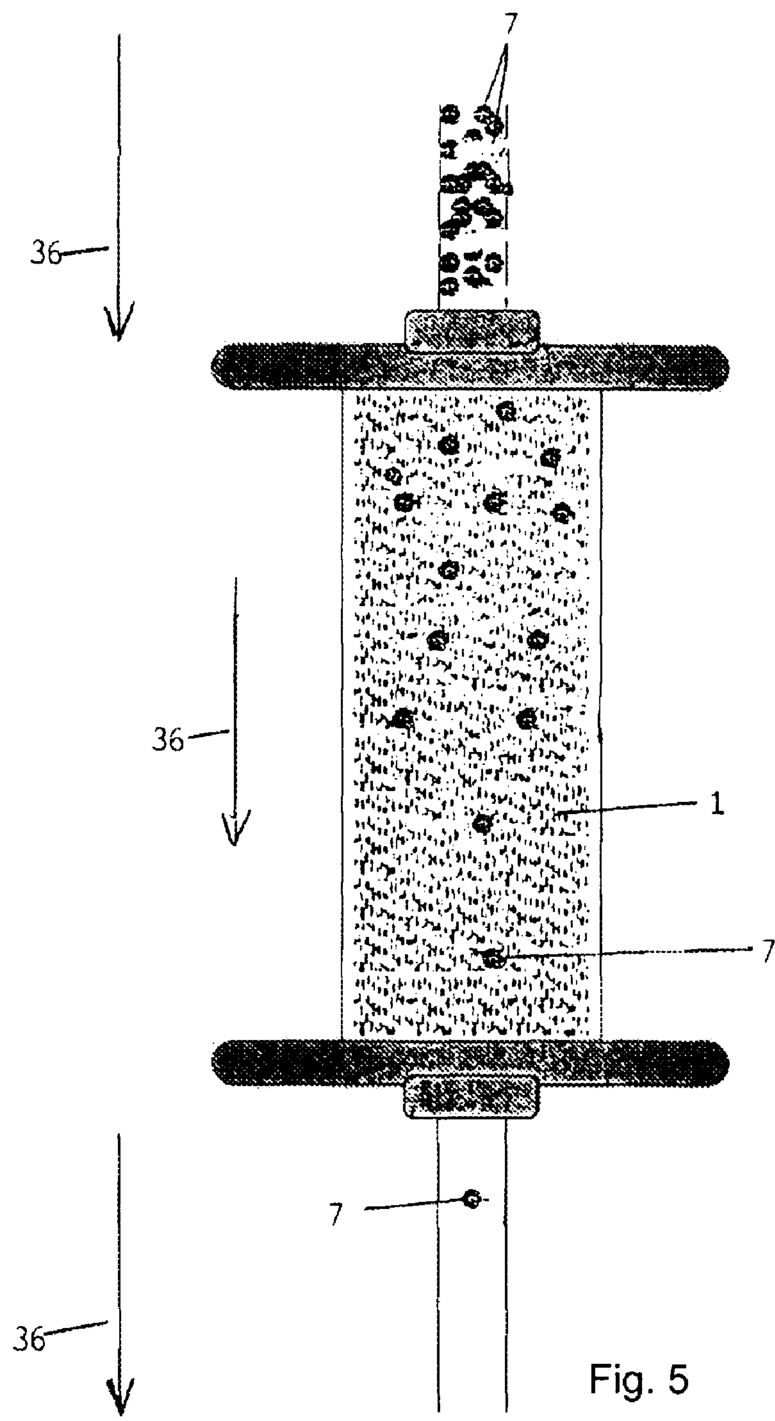
FIG. 5 shows certain embodiments of the invention which comprise a layered double hydroxide layer.
Figure 6:
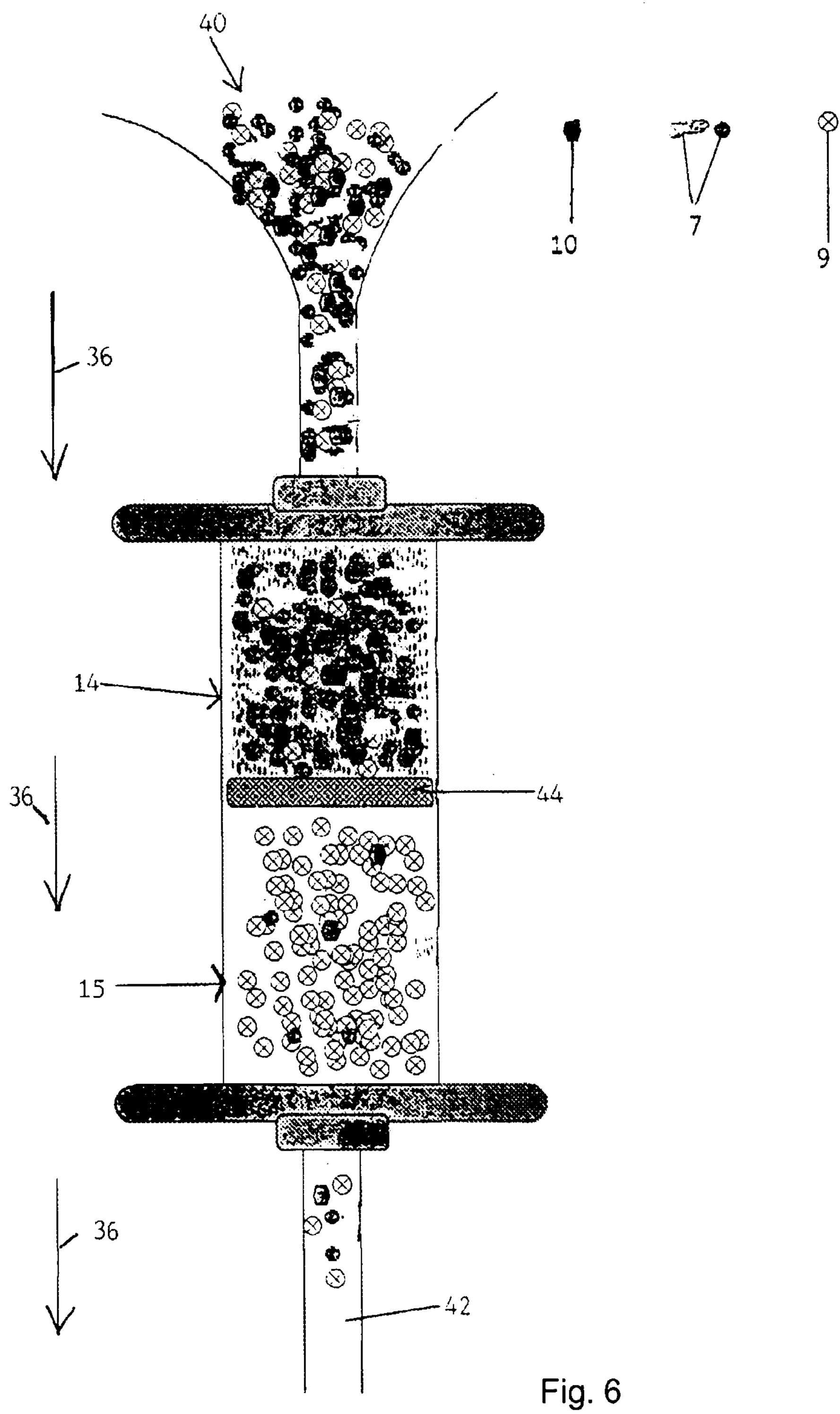
FIG. 6 shows certain embodiments of the invention which comprise layered double hydroxide and lignin layers.

The present invention may provide, in embodiments, functionally situating unpowered charged sorbent medium (3) with lignin or even functionally situating an amount of LDH with an amount of lignin. This may include moving at least some of a fluid near or through LDH and some fluid may be moved near or through lignin. Depending on the type of environment, a fluid may be desired to first be filtered through LDH and then through lignin. Or it may be desirable to first filter a fluid through lignin then through LDH. This may include stacking or layering LDH and lignin. In FIG. 6, a LDH layer (14) and a lignin layer (15) in a column is shown. A fluid (40) having various contaminants such as anionic contaminants, biological agents, or cationic contaminants may move in a flow direction (36) through a column. In embodiments, a fluid may pass through a LDH layer (14), a porous barrier (44) and a lignin layer (15). A fluid may move out of a column with a reduction (42) of contaminants. As illustrated in FIG. 5, a column may contain at least LDH. While it can be used in columns, other embodiments may include layering with at least two sheets of medium, such as paper, in which one is coated with LDH and the other is coated with lignin. These sheets may be layered, one in front of the other and may even be separated by a certain amount of distance—such that the fluid may come into contact with both LDH and lignin. Functionally situating may include LDH compositions that are separate and distinct from lignin. By separate and distinct, LDH may not be mixed with lignin. This may include layers of LDH and layers of lignin and may even include separate filter with lignin and a separate filter with LDH. Contrarily, lignin and LDH may be intermixed with each other, in a solution or coated together on the same filter, and the like.

In embodiments, the present invention may include a cationic contaminant (9). A cationic contaminant (9) may be any cation and may include lead, chromium, zinc, mercury, ammonium, sodium, calcium, iron, copper, and the like. Lignin may include a cationic contaminant sorbent in which cationic contaminants may be attracted and sorbed on lignin.

Figure 10:
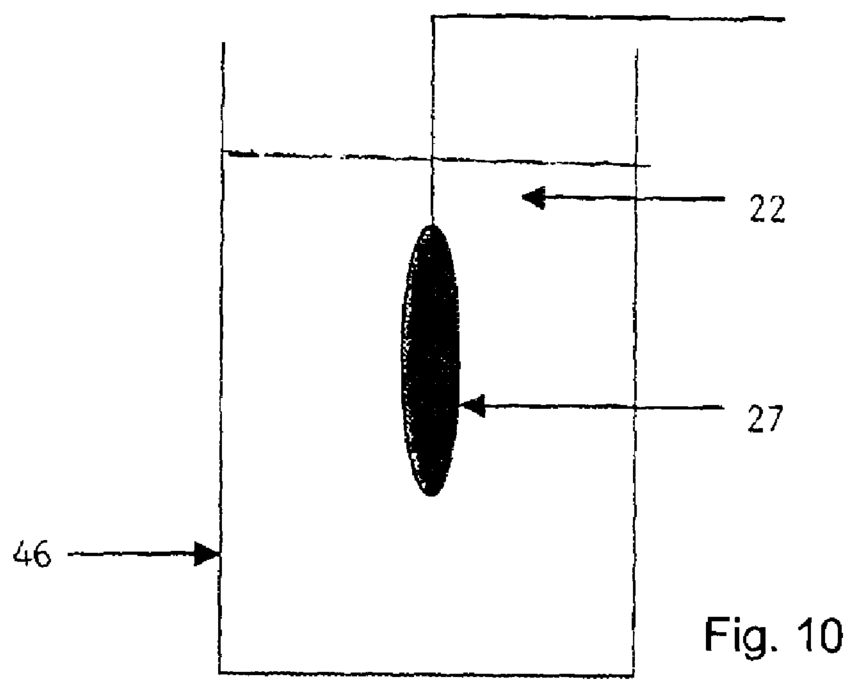
FIG. 10 shows certain embodiments of the invention which comprise layered double hydroxide compounds that can sorb nonionic organic contaminants (NOCs).

In embodiments the present invention may include containing an amount of organic composition (17). Referring to FIG. 10, LDH compounds or even organic compositions can sorb nonionic organic contaminants (NOCs) from aqueous systems. Various organo-LDH compounds in accordance with the invention can be synthesized by intercalation of a variety of organic anions in the alternative to intercalation of inorganic anions. The resulting organo-LDH compounds can have organophilic properties. These modified organo-LDH compounds can exhibit high sorption capacity for various NOCs, such as 1,2,4-trichlorobenzene, 1,1,1-trichloroethane, trichloroethylene, tetrachloroethylene in aqueous solutions. Compounds in accordance with the invention as shown in FIG. 10, provide an interlayer arrangement of anionic surfactants such as octylsulfacte, dodecylsulfate, octylbenzenesulfonate, dodecylbenzenesulfonate, or the like. These examples are meant to be illustrative of the wide variety of anionic surfactants that can be intercalated between brucite layers in accordance with the invention.

In embodiments, the present invention may provide for moving a fluid in the vicinity of an organic composition (17). Impurities in the fluid may be attracted and may even be sorbed by the organic composition (17). Particularly, organic compositions may sorb non-ionic organic contaminants (20). For example, non-ionic organic contaminants may include benzene, ethybenzene, toluene, xylenes, other aromatic compounds, perchloroethene, trichloroethene, dichloroethene and the like. In embodiments, the present invention may include moving a fluid with a reduction of non-ionic organic contaminants (20).

In other embodiments, a percentage non-ionic organic contaminant reduction amount may be removed from a fluid. While any percentage of removal is possible, such possibilities may include:

about 70% non-ionic contaminant reduction;
about 75% non-ionic contaminant reduction;
about 80% non-ionic contaminant reduction;
about 85% non-ionic contaminant reduction; and
about 90% non-ionic contaminant reduction;

Other percentage removals are certainly possible and all should be understood as represented within the scope of this invention.

In embodiments, the present invention may provide removing harmful biological agents from fluids such as air and water. Some harmful biological agents may include coronavirus, influenze, *bacillus anthracis*, measles, smallpox virus, among any disease that may cause a severe illness, perhaps even death.

In an embodiment, the present invention may include providing an amount of LDH functionally situated with lignin and organic compositions (17), as previously discussed. An organic composition may be mixed with lignin and LDH. In embodiments, the present invention may provide an organic composition layer, an LDH composition layer and even a lignin layer.

Unknown prior to the invention, was that the positive charges on the surface of LDH compounds make them ideal sorbents with respect to removing a wide range of biological agents, which as a whole or as regions, present negative charge. Although biological agents, such as bacteria, viruses and fungi, may also present some localized positive charges at specific pH values, LDH compounds, organo-LDH compounds, lignin-LDH compositions and even surfactant modified LDH in accordance with the invention are capable of sorption of such bacteria and viruses to capture, to collect, to retain, to sequester, to inactivate, or to remove, them from aqueous liquids or aqueous process systems.

In other embodiments, a percentage biological agent reduction amount may be removed from a fluid. While any percentage of removal is possible, such possibilities may include:

about 70% biological agent reduction;
about 75% biological agent reduction;
about 80% biological agent reduction;
about 85% biological agent reduction;
about 90% biological agent reduction;
about 95% biological agent reduction; and
about 100% biological agent reduction.

Other percentage removals are certainly possible and all should be understood as represented within the scope of this invention.

The biological agent removal may be dependent on the contamination type, concentration, LDH type, competition anions and solution pH, among other factors. At a low anion concentration, the reduction rate may be about 100%. At a high concentration, the reduction rate may be about 60%. Accordingly, such removal rates may vary.

In other embodiments, a percentage cationic contaminant reduction amount may be removed from a fluid. While any percentage of removal is possible, such possibilities may include:

about 80% cationic contaminant reduction;
about 85% cationic contaminant reduction;
about 90% cationic contaminant reduction; and
about 95% cationic contaminant reduction.

Other percentage removals are certainly possible and all should be understood as represented within the scope of this invention.

As a non-limiting example, certain LDH compounds in accordance with the invention can be used to retain, sequester, or remove, MS2 (an indicator bacterial phage) virus, Phi-X 174, *Escherichia coli* strains (an indicator bacterium) or *Pseudomonas arugenosa* from deionised water, tap water, or ground water having a pH range of 6.3-7.5, a residence time of 0 min to 3.0 hr, and temperature at 4-30° C. Viral adsorption efficiency of LDH compounds in such aqueous systems can be 100% and 99.9% at viral concentrations of $2\times10^6$ plaque forming unit (PFU)/L and $2\times10^8$ PFU/L, respectively. The loading ratio in the case of MS2 adsorption is approximately $1.5\times10^{11}$ to $8.0\times10^{12}$ PFU/kg of LDHs. Bacterial adsorption efficiency can be 99.9% at an *E. coli* concentration of $3.7\times10^8$ colony forming unit (CFU)/L. The loading ratio in *E. Coli* adsorption can be approximately $2.2\times10^{11}$ CFU/kg of LDHs.

As another non-limiting example, certain LDH compounds in accordance with the invention can be used to retain, sequester, or remove general bacteria from tap water and raw river and creek water having a pH range of 7.0-8.5, a residence time of 15 min to 45 min, and temperature at 20-30° C. Bacterial adsorption efficiency of LDH compounds in such aqueous systems can be 75-100% at background bacterial concentrations of $5\times10^5$-$2\times10^7$ CFU/ml.

In embodiments, LDH and even lignin can be packed or coated to carrier materials to make water filtration units. The filtered water, under this design, may be drinkable or potable. This type of apparatuses may be made as disposable tubes, pumps, columns, and other tools to produce drinkable water in the field where no potable water may be available.

In other embodiments, LDHs and even lignin can be packed into a unit that connects to a tap water faucet directly or even through an adaptor. The filtered water may be free or very low in metals and potential pathogenic agents.

In an embodiment, LDHs or even lignin may be used in a large scale column or vessel filter, which can be added to conventional drinking water or wastewater treatment process as a polishing step for disinfection.

In an embodiment, LDH can be coated to a membrane surface and used to concentrate bio-agents, such as viruses, bacteria, and other biological molecules. The collected LDH-bioagents may serve as samples for detection, identification, characterization and other applications. The LDH containing collector may highly concentrate bioagents present in water bodies; therefore it may increase the sensitivity of early detection of bioagents in waters.

In embodiments, LDH and even lignin can be used as air filters that possess high affinity to potential pathogens in the air. The filters can be used for both residential and commercial buildings.

In embodiments, the present invention may include a water treatment apparatus. A water treatment apparatus may include any type of device or apparatus or system that can be used to remove impurities from water. This may include, but is not limited to batch process containers, flow through containers, coated sand columns, columns, bags, tubes, coating support, and filters. The present invention may include establishing an amount of water desired to be filtered. LDH, lignin, organic composition, individually or in any combination may be contained in a water treatment apparatus or even on a water filter. As previously discussed, different types of impurities may be attracted and even sorbed onto a water filter having various sorbents.

A water treatment apparatus may be attached to any type of plumbing system and may even be attached to a water outlet attachment. In other embodiments, the present invention may include attaching a water treatment apparatus to any type of plumbing such as a water inlet, outlet fixture, or the like. After attachment, the present invention may include running water through the water treatment apparatus to remove any impurities or contaminants that may be in the water. A water outlet attachment may include any type of attachment configured to attach to a conduit, a sink faucet, outdoor conduit, and the like. Water treatment apparatus may be used to treat different quantities of water. Some water treatment apparatus may include a high volume water filter in which large amounts of water may be treated. This may be useful for municipal applications.

Figure 9:
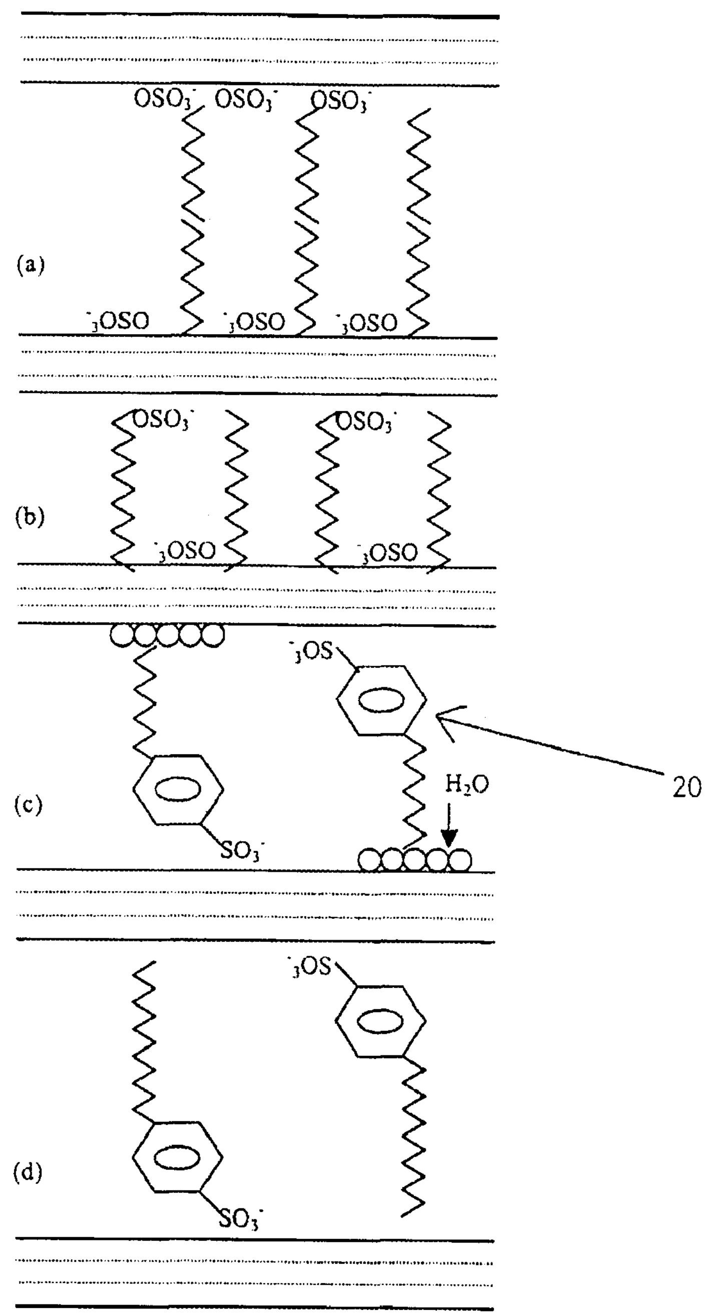
FIG. 9 is a representative view of an embodiment for water purification of the present invention.

In some embodiments, the water treatment apparatus may be portably used for any type of water use perhaps even outdoor use. In other embodiments, the present invention may include a disposable semipermeable unit (27) as shown in FIG. 9. A disposable semipermeable unit (27) may be a container of thin paper or cloth which may contain a measured amount of sorbents. A disposable semipermeable unit may be placed in an amount of water (22), may be placed in a water container (46), and may even be in an amount of water sufficient for individual use. A disposable semipermeable unit may be a capsule or pouch, or any type of containment structure that may allow water to flow into and out of the disposable semipermeable unit while containing sorbents inside. A disposable semipermeable unit (27) may be manually handled during use. Manually handling may include a user holding the unit or even holding a string attached to a unit, stirring water with a disposable semipermeable unit, and the like. The disposable semipermeable unit may contain an anionic component, cationic components, LDH composition, lignin, organic compositions, and the like sorbents, individually or even in combination, as discussed previously.

In embodiments, the present invention may include removing impurities with re-activated cationic composition or even re-activated LDH. In an embodiment, the present invention provides for a reactivation element (51). Once an cationic composition or even LDH has sorbed anionic contaminants, such as bioagents, they can be calcinated (e.g., heated) to convert the LDH compound retaining such collected biological agents back to the original structural configuration which can then again be used to collect bio-agents. This makes LDH compounds in accordance with the invention ideal candidates for industrial applications. LDH compounds, along with the sorbed biological agents, can be incinerated at between about 400° C. to about 450° C. for a duration of between about one hour to about three hours depending on the LDH compound (two hours typically being sufficient) to affect complete decomposition of retained organic materials, including bio-agents, and convert the structural configuration of the used LDH compound to the activated structural configuration capable again of attracting, collecting, retaining, or otherwise having an affinity for biological agents or organic compounds. The impurity, contaminant, and even biological agent that was sorbed on LDH may be removed by this process. After removal of the impurities, LDH may be rehydrated and used to sorb other impurities. The ability to regenerate, reactivate, or restore used LDH compounds allows LDH compositions and even organo and LDH compounds, in accordance with the invention, to be repeatedly regenerated and used over and over to attract or collect bio-agents or organic compounds.

After LDH compounds are used to collect bio-agents, they can be dissolved in acid solution and the collected bio-agents can be inactivated in acid solution. Then the LDH compounds can be resynthesized by coprecipitation of an acid solution with base, for example, sodium hydroxide or potassium hydroxide. The ability to regenerate, reactivate, or restore used LDH compounds allows LDH compounds, in accordance with the invention, to be repeatedly regenerated and used over and over to attract or collect bio-agents or organic compounds.

In other embodiments the present invention may include detecting any impurities that may have been sorbed on a sorbent, identifying an impurity or even a biological agent. A biological agent identification element (52) may include some type of sensor that may respond in some fashion when biological agents may be detected.

In an embodiment, the present invention may provide moving at least some of a fluid through a primary medium or even a primary filter. A primary filter (45) may be any kind of filter that is known in the art or even as discussed in this application that can be included in addition to a medium or filter as discussed above. Here, one could simply add a filter as discussed in this invention to a previous existing filtration system. The primary filter may be used as a first filtration system and may prevent at least some of certain impurities, contaminants, components, such as but not limited to dust, dirt, and the like from moving through said primary filter. Then the fluid can pass through an unpowered charged sorbent medium, such as an LDH filter, a lignin filter, or even a combination of the two. This may provide extended use of such unpowered charged sorbent medium. It may be desirable to replace the primary filter more often than the LDH filter, as an example.

In other embodiments, the present invention may include providing an air filter. A filter (43) may be represented in FIG. 11. An air filter may include any type of substance in which air may be permeable. An air filter may include but is not limited to, a membrane, filter, batch process containers, flow through containers, columns, tubes, coating support, carrier materials, masks, particles and the like. Air filters may have a flat surface or may even have a pleated surface to add to the surface area to the filter. LDH, lignin, organic composition, or the like, individually, separately or in any combination may be applied to an air filter. This may include spraying LDH, lignin, or even organic composition on paper, coating a filter with LDH, and the like.

Figure 11:
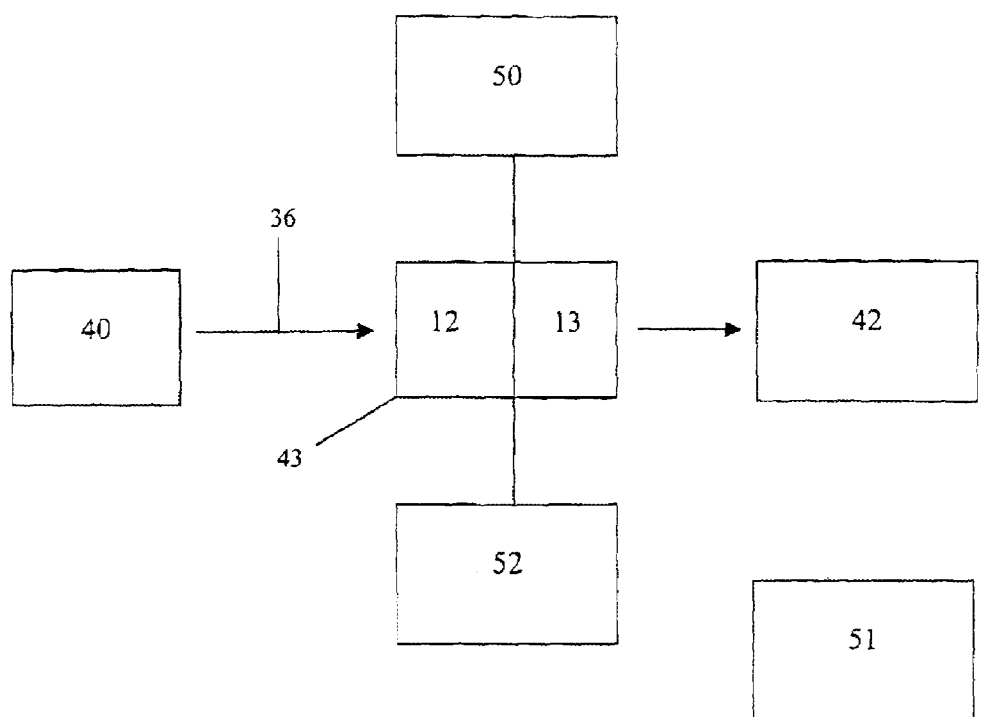
FIG. 11 is schematic view of an embodiment of the invention showing some of the more conceptual elements that may be included.
Figure 12:
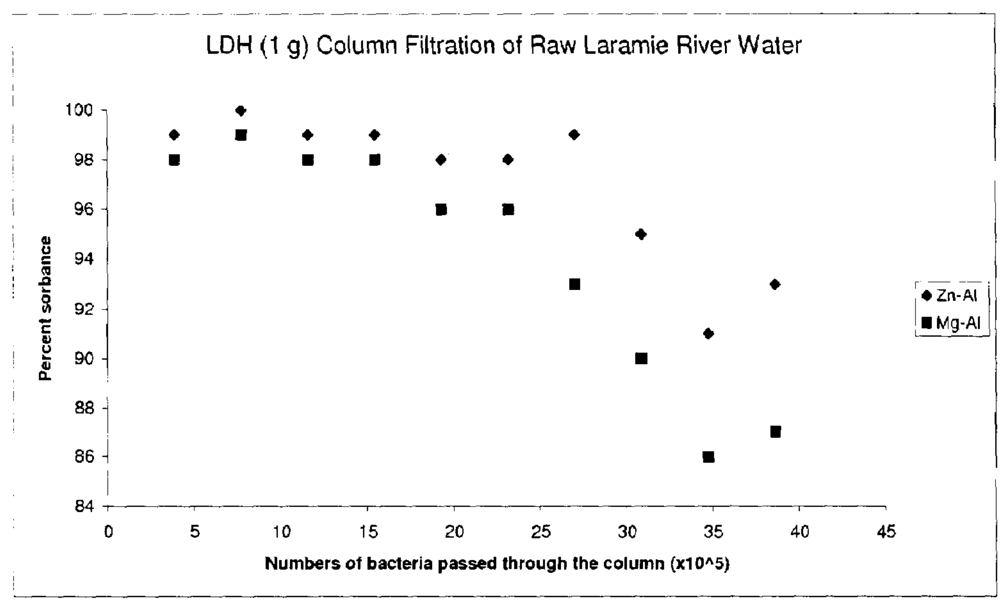
FIG. 12 is a graph showing LDH (1 g) column filtration of raw Laramie River Water.
Figure 13:
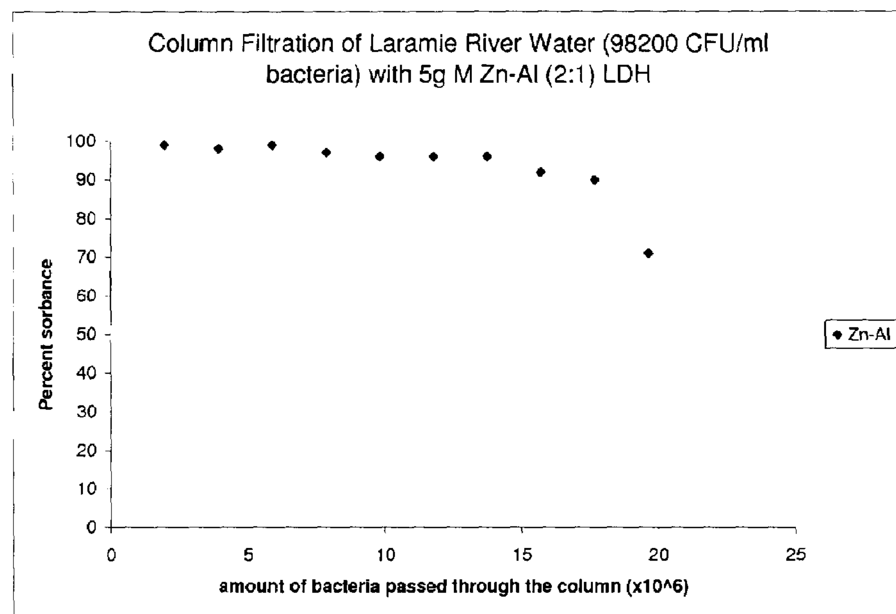
FIG. 13 is a graph showing column filtration of Laramie River water (98200 CFU/ml bacteria) with 5 g M Zn—Al (2:1) LDH.
Figure 14:
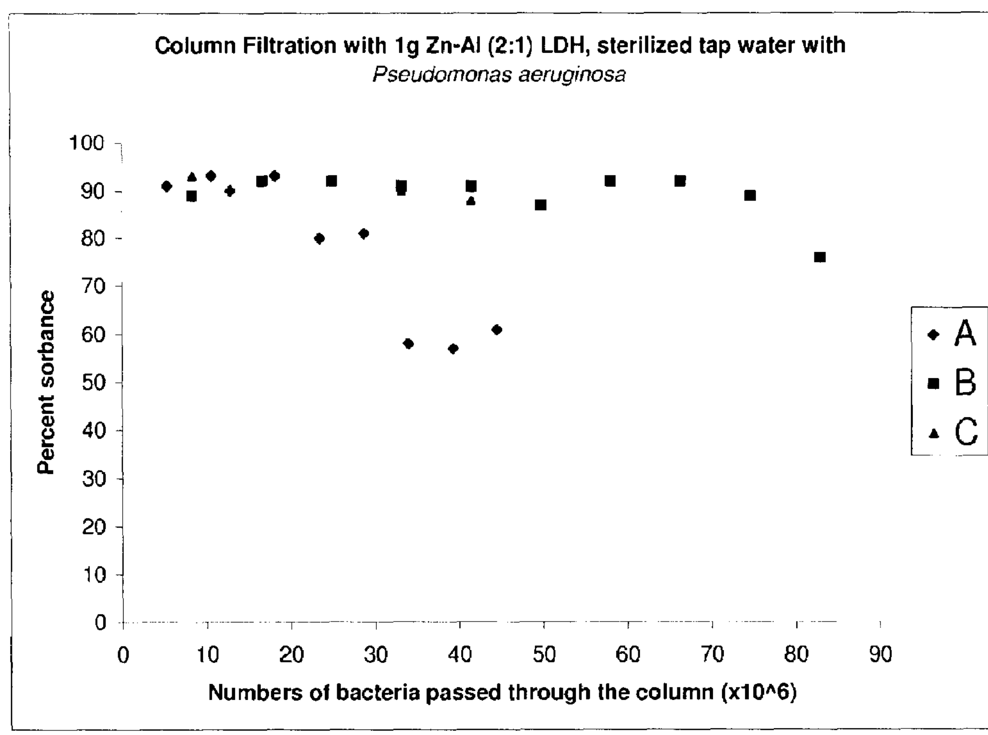
FIG. 14 is a graph showing column filtration with 1 g Zn—Al (2:1) LDH, sterilized tap water with *Pseudomonas aeruginosa.*
Figure 15:
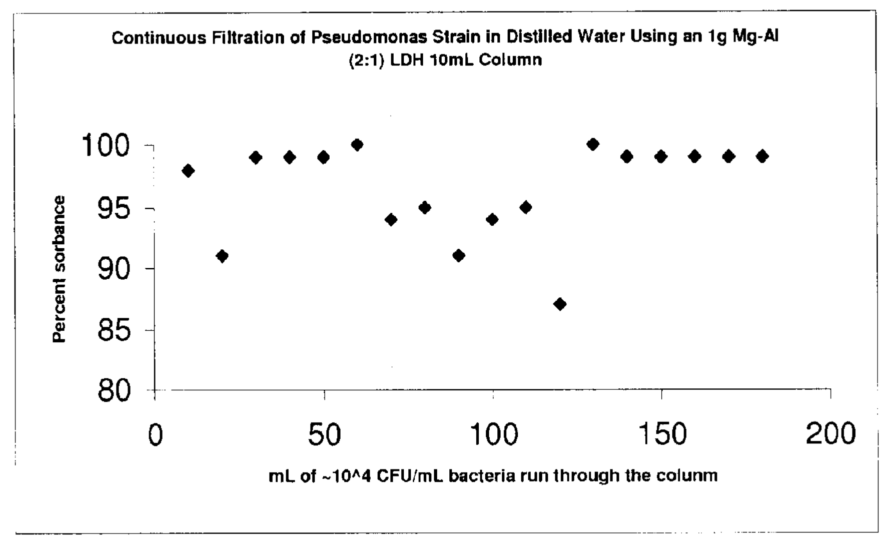
FIG. 15 is a graph showing continuous filtration of *Pseudomonas* strain in distilled water using an 1 g Mg—Al (2:1) LDH 10 mL column.
Figure 16:
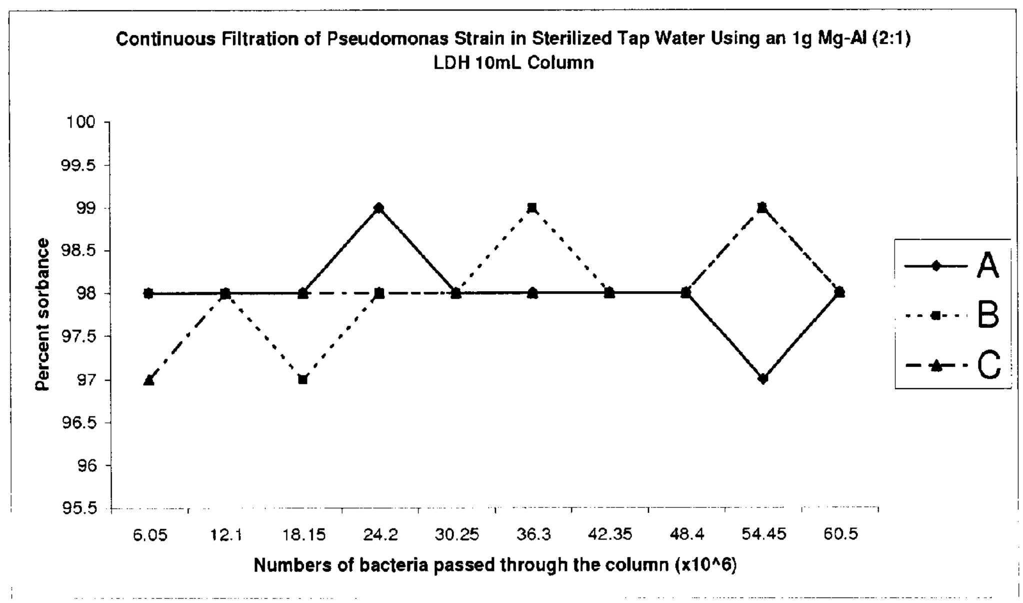
FIG. 16 is a graph showing continuous filtration of *Pseudomonas* strain in sterilized tap water using an 1 g Mg—Al (2:1) LDH 10 mL column.
Figure 17:
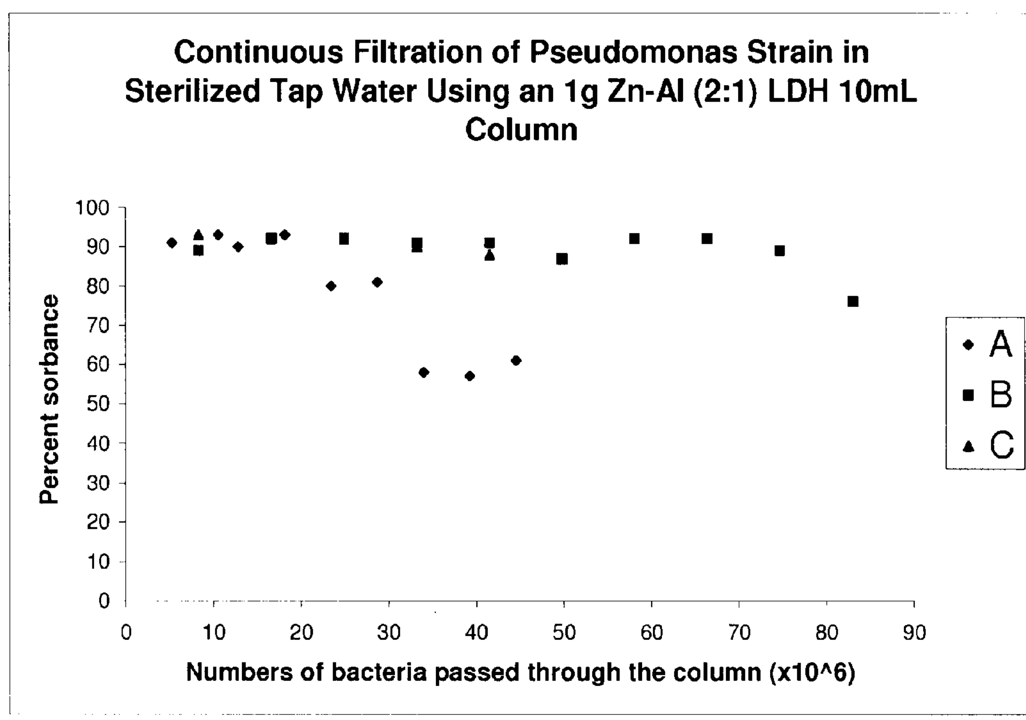
FIG. 17 is a graph showing continuous filtration of *Pseudomonas* strain in distilled water using an 1 g Zn—Al (2:1) LDH 10 mL column.
Figure 18:
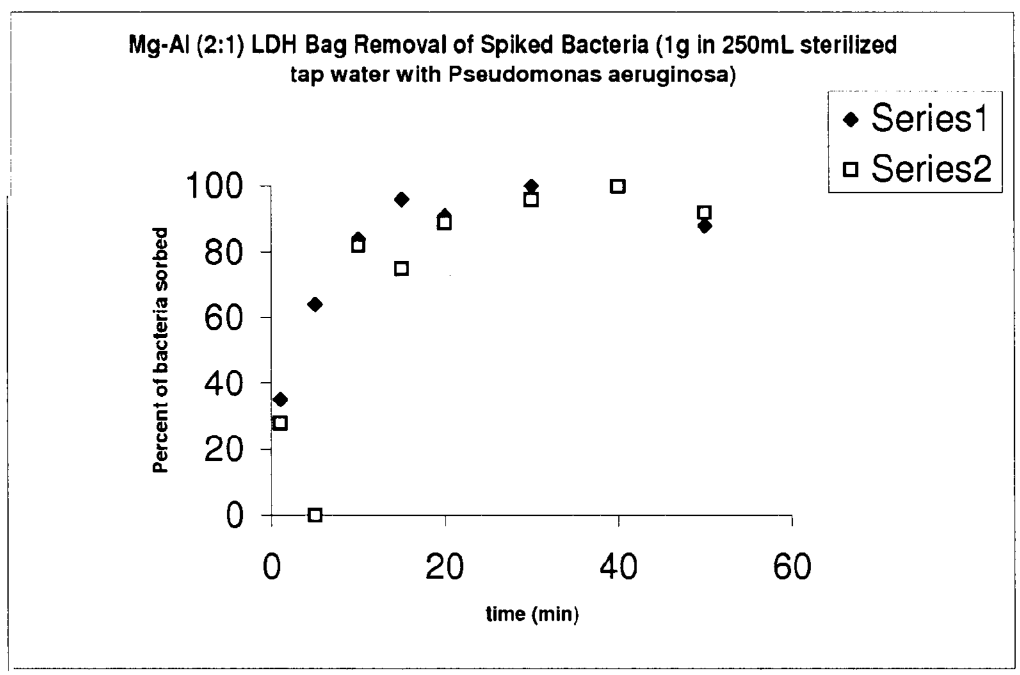
FIG. 18 is a graph showing Mg—Al LDH bag removal of spiked bacteria (1 g in 250 mL sterilized tap water with *Pseudomonas aeruginosa*)

As shown in FIG. 11, a fluid (40) may move in a flow direction (36) through a filter (43). A filter may be any type of filter including, but not limited to a water or air filter. A filter (43) may include cationic compositions (12) and may even include anionic components (13). After passing through a filter (43), a fluid may have a reduction (42) of contaminants. A circulation element (50) may be included to circulate a fluid. Further, an identification element (52) may be included which may detect and even identify contaminants, anionic contaminants, and even biological agents. A reactivation element (51) may be included which may be used to re-activate or even recycle an anionic composition, perhaps even a LDH composition.

In embodiments, the present invention may include electrostatically sorbing contaminants. This may include creating any type of medium with electric charges or even currents in which impurities or contaminants may be sorbed.

The present invention may include establishing respiratory air in a confined community gathering location. Air or even respiratory air may include air that is intended or may be breathed by an animal or human being. A confined community gathering location may include any location in which a few or even several people may meet and which contaminants may exist in the air. This may include a building, school, home, and the like. An air filter may include LDH so that when air may be moved near or through the air filter, anionic contaminants may be attracted and may even be sorbed to the LDH, as discussed above. The air may be moved and circulated in a confined community gathering location with a reduction in anionic contaminants, for example, bioagents. As such, the present invention may provide for circulating purified air in an aircraft, commercial building, residential structure, vehicle or the like. Further, in embodiments, an air filter may contain lignin which may attract and sorb cationic contaminants, also discussed previously. Air filters may be used in a number of different applications. For example, but not limited to, an air filter may be configured for an airplane, commercial building, a residential structure, a vehicle, and the like.

Figure 8:
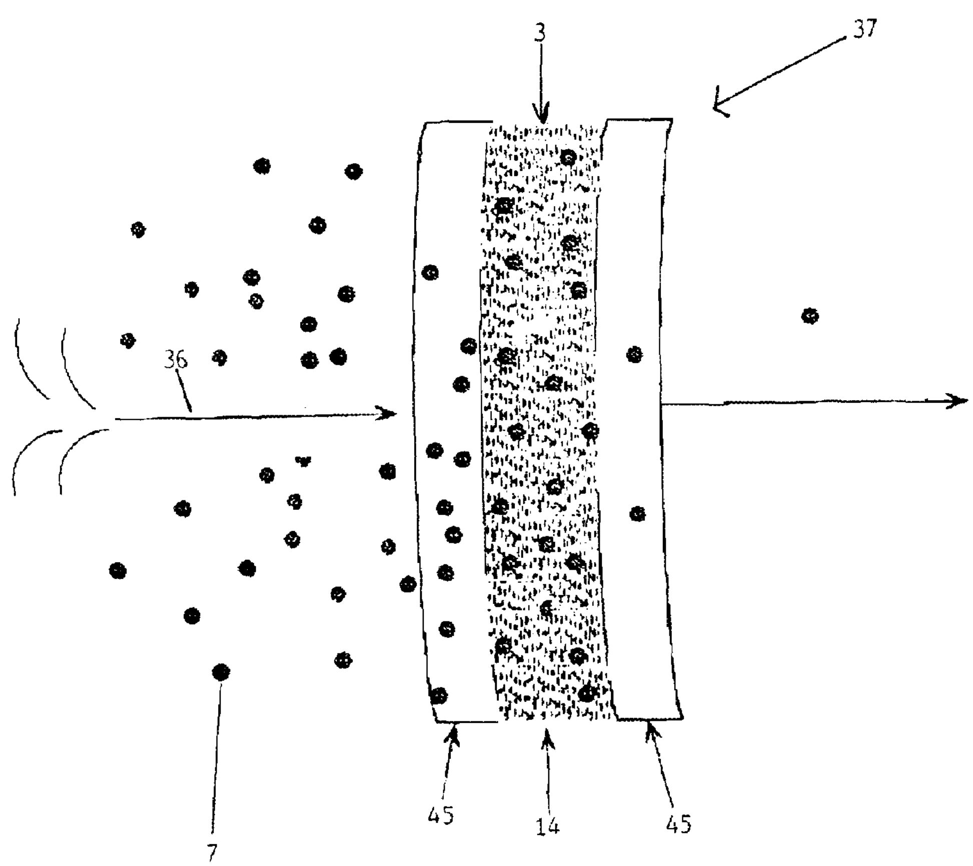
FIG. 8 is an embodiment of the present invention of a mask.

An individual may be contaminated with a communicable illness, such as the flu, severe acute respiratory syndrome (SARS), or the like. That individual may want to prevent others from catching the illness, or even an individual may desire to protect themselves from breathing in contaminants. In embodiments, the present invention may provide for a wearable mask (37) having an amount of LDH composition on it. In FIG. 8, a representation of a mask (37) is shown. A mask may include a cloth or even a paper material that may have a LDH layer (14). The air flow may include the air one inhales or the air the one exhales. As the air flow may move in an air flow direction (36) through a mask, bioagents (7), as shown in FIG. 8 may be sorbed onto LDH. Of course, any contaminant may be sorbed onto a wearable mask such as but not limited to anionic contaminants, cationic contaminants, and even non-ionic organic contaminants. In embodiments, a wearable mask may include individually, or in combination, anionic components, cationic components, organic components, LDH composition, and even lignin. In embodiments, a wearable respirable mask may be a disposable mask. A mask may be any type of mask, as know to those skilled in the art and may be placed on at least part of a face that may allow the passage of air and moisture. The present invention may provide covering at least a nose and mouth to ensure all or most of the air either exhaled or inhaled may be filtered. The mask may be attached to at least part of a head. This may include, but is not limited to, attaching strings or the like around the ears, providing an elastic band that goes around a circumference of a head, and it may even include providing strings that can be tied together around the head. In embodiments, the wearable respirable mask may be removably sealingly attached to a user's face. To ensure that most of the air may be filtered, some sort of seal may be desirable where the mask and the face contact. This may simply be a tight securement of the mask to the head and may even have some sort of elastic edge to the mask. It may be desirable to remove and possibly reattach the mask. A user may then respire or flow air through the mask. As a user is inhaling, the outside air may be passed through the mask, allowing any contaminants, and even bioagents to be attracted and sorbed onto LDH. Contrarily, a user may exhale air and any bioagents contained in the exhaled air may be attracted and sorbed onto the LDH. In embodiments, a wearable mask (37) may include a primary filter (45), as discussed above.

After using a wearable mask, the mask may have biological agents substantially sorbed on the surface of the LDH composition, as discussed above. In other embodiments, the wearable respirable mask may include providing lignin on a mask and the mask may even include other organic compositions. The wearable mask may include individually or in combination lignin, LDH or an organic compositions for the removal of cationic contaminants, anionic contaminants and nonionic organic contaminants. As discussed above the lignin may be layered on the mask with LDH or may even be chemically associated with LDH. Any or even all of the sorbents may be sprayed on paper. Of course, any way to attach the sorbents to some sort of filter is meant to be included in this disclosure.

In embodiments, the present invention may provide attracting a first component to a vehicle air filter. In embodiments, an air filter may include a vehicle air filter in which a LDH composition may be provided on an air filter. In other embodiments, an air filter used in a vehicle may contain, but is not limited to a cationic composition, an anionic composition, LDH, lignin, organic compositions, individually or in any combination. A vehicle air filter may be placed in a vehicle possibly near the air vents, or at any place in the car. A vehicle air filter may even include a mechanical device which may be plugged into a cigarette lighter for power. A vehicle may have an enclosed space in which air may be established in the vehicle. Of course, a window or door may be opened in which air flow from the outside may occur. The air in a vehicle or even respiratory air in a vehicle may interact with a vehicle air filter. Any contaminants may be attracted and sorbed on the vehicle air filter. Of course, such contaminants may include anionic contaminants, cationic contaminants, biological agents, and even non-ionic contaminants, as previously discussed. The air can be circulated in the vehicle with a reduction in contaminants and even a reduction in bioagents. Occupants of a vehicle may release contaminants when sneezing or coughing, or even simply breathing creating air which may need to be re-filtered and then re-circulated. In other embodiments, the vehicle air filter may include lignin and may even include other organic compositions to remove anionic contaminants and non-ionic organic contaminants.

The present invention can be used in a wide variety of applications. For example, using an unpowered charged sorbent medium, LDH composition, lignin composition and even organic compositions for commercial use, residential use, personal use, and the like.

EXAMPLE I

Virus stocks were diluted in artificial groundwater ($CaCl_2$ 0.075 mM, $MgCl_2$ 0.082 mM, KCl 0.051 mM and $NaHCO_3$ 1.5 mM) having pH 7.5. A 5 ml aliquot of LDH stock solution (ultrasonically dispersed) was transferred to sterilized 25 ml Screw-top Corex glass centrifuge tubes. To avoid generation of an air-water interface (AWI), 25 ml of virus solutions were transferred into such tubes to form a meniscus at the tube opening and capped. Tubes containing the mixture of LDH solution and virus solution were mixed in an end-over-end shaker at 20 rpm for 3 hr at between 4-7° C. and then centrifuged at 9,000 g for 15 min. Virus concentration in LDH suspensions was determined by plaque assay. All experiments were conducted with three replicates and using control blanks. Data results can be found in Tables 1-10.

EXAMPLE II

LDH-coated sand was generated by transferring 1000 g oxide-removed sand to a plastic beaker and 2 L 5% LDH solution was added. The mixture was autoclaved for 1 hr and oven dried at 80° C. with occasionally stirring. The LDH-coated sand was then washed extensively with distilled water to remove unbound LDH and oven-dried. Acrylate columns having top and bottom plates sealed with O-rings were fitted with a stainless steel screen on the bottom plate. LDH-coated sand was transferred in 1-cm increments into the column prefilled with deaerated water and stirred to prevent layering and air entrapment. Around 100 pore volumes (PV) of buffer solution (AGW) are pumped into the sealed columns with a peristaltic pump to establish a steady-state flow condition. Virus solutions were pumped into separate corresponding columns and outflow samples were collected in 4 ml glass tubes using a fraction collector. The concentrations of viruses in the various samples were determined by plaque assay.

EXAMPLE III

Sand LDH-lignin columns were prepared and equilibrated as described in Example II. Bacteria solutions were pumped into separate columns prepared and outflow samples were collected in 4 ml glass tubes using a fraction collector. The concentrations of bacteria in the various samples were determined by plaque assay.

EXAMPLE IV

Sand LDH-lignin columns were prepared and equilibrated as described in Example II and III. Mixtures of virus and bacteria solutions were pumped into separate columns prepared and outflow samples were collected in 4 ml glass tubes using a fraction collector. The concentrations of bacteria in the various samples were determined by plaque assay.

EXAMPLE V

LDH was made in granular form with particle sizes (e.g., 0.3 mm-3 mm diameter) that facilitate reasonable water flow rate. One to five grams of LDH was packed into a 10 ml syringe sized column with glass wool at the outflow port. Bacteria/virus containing water flow into the column and the effluent concentrations were determined by colony/plaque assay. Approximately 200 mls of raw river water (98200

CFU/ml bacteria or $1.8\times10^7$ total bacteria) may be filtered with 5 g of LDH material. Effluent water from such a filtration system may be potable with sufficient removal of bioagents. An expanded example of this application is to increase the amount of LDH and column size proportionally to treat larger quantity of raw or partially treated bacteria/virus containing water.

EXAMPLE VI

LDH was made in granular form with particle sizes (e.g., 0.3 mm-3 mm diameter) that facilitate reasonable water flow rate. LDH was packed into a sizable column with glass wool at the outflow port. The column may be attached to a pump. Bacteria/virus containing water flew into the column and the effluent concentrations were determined by colony/plaque assay. Approximately 200 mls of raw water (98200 CFU/ml bacteria or $1.8\times10^7$ total bacteria) may be filtered with 5 g of LDH column. Effluent water from such a filtration system may be potable with sufficient removal of bioagents. The sizes of the column and pump are flexible based on the amount and quality of water to be filtered. Such a system may be used for military personnel, field travelers, small municipality, rural farms, etc.

EXAMPLE VII

LDH was made in granular form with particle sizes (e.g., 0.3 mm-3 mm diameter) that prevents its leakage from a porous wrap such as double layered cheese cloth. Five grams of LDH was packed into a doubled layered cheese cloth and put into a cup of 200 ml of raw river water (8200 CFU/ml bacteria or $1.8\times10^7$ total bacteria). The bagged LDH was placed in the water for 30 min with or without stirring. Treated water from such a system may be potable with sufficient removal of bioagents. An expanded example of this application is to increase the amount of LDH material proportionally to treat larger quantity of raw or partially treated bacteria/virus containing water.

EXAMPLE VIII

LDH was made in powder or granular form and packed in a treatment tank, vessel or similar containers. Amount of LDH is determined based on the quality of the water to be treated. This system may be added to an existing water treatment process as a bioagent removal step. Applications include residential and industrial water treatment facilities.

EXAMPLE IX

Air-filter devices were prepared using acrylate columns as described in Example II. Air or other partial pressures of gases are passed through a liquid solution to collect the bacteria or virus, or both, in the volume of gases. The liquid solutions were then pumped into separate columns prepared and outflow samples were collected in 4 ml glass tubes using a fraction collector. The concentrations of bacteria in the various samples were determined by plaque assay. Control blanks were run in a substantially identical fashion to provide a baseline for comparison.

EXAMPLE X

Gas filter devices can be prepared using a carrier material such as ceramic or fabric material. LDH compounds can be used to coat a variety of carrier materials with an amount of LDH compound sufficient to afford nano-structural exclusion or electrostatic sorption of biological agents present in ambient air. Air flow through the gas filter devices can be facilitated with pressure differential generation devices such as pumps or fans. Air or other partial pressure of gases are passed through the gas filter device to collect the bacteria or virus, or both, in the volume of gases. The concentrations of bacteria in various samples can be determined by plaque assay. Control blanks can be run in substantially identical fashion to provide a baseline for comparison. The LDH coated fabrics and particles can be used in one embodiment as an additional filter layer in a respirator canister or in household air purifiers, or the like.

EXAMPLE XI

The data gathered may show that LDH in a bag can sorb bacteria such as *Pseudomonas aeruginosa* and extrapolately other bacteria in water samples (see Tables 6-10). In most of the tests, the LDH bag (ranging from 1 g of LDH to 4 g) removed 90 percent of bacteria from the 500 mL bottle of water (250 mL in Table 6) in 30 min or less (see Tables 6-10 excluding 9, the Zn—Al LDH).

Make LDH bags by sewing a 5×10 cm piece of cloth with fishing wire with a measured amount of LDH inside (size 2.36-4.75 mm). When finished, autoclave the bags at 122 degrees C. for 15 min to sterilize. Prepare dilution test tubes by putting 9 mL of sterile tap water in each one. Centrifuge the bacterial TSB solution for 15 min at 3400 rpm, decant the broth, add sterile water in its place. Dilute the bacterial solution with 1/10 dilutions until desired concentration is obtained. (For this case, 500 mL of ~10^2 CFU/mL is desired for each bottle so take 5 mL of 10^4 solution in 495 mL of sterile tap water). Take reference samples of the solutions in each of the 500 mL bottles before the LDH bag is added. Plate 100 uL of each bottle (usually do triplicates) onto TSA petri dishes. Place the LDH bags inside of the bottles and start timing. Collect and plate 100 uL of each at desired times. Dip a glass spreader into alcohol, flame, let cool, and use to spread the 100 uL solution on each of the TSA petri dishes. Seal with parafilm, set aside until later to put in an incubator overnight at 35 degrees C. Count the colonies in the morning.

As can be easily understood from the foregoing, the basic concepts of the present invention may be embodied in a variety of ways. It involves both water and air purification techniques as well as devices to accomplish the appropriate filter. In this application, the water and air purification techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure. This application seeks examination of as broad a base of claims as deemed within the applicant's right and will be designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "sorbent" should be understood to encompass disclosure of the act of "sorbing"—whether explicitly discussed or not—and, conversely, were there effectively disclosure of the act of "sorbing", such a disclosure should be understood to encompass disclosure of a "sorbent" and even a "means for sorbing" Such changes and alternative terms are to be understood to be explicitly included in the description.

U.S. PATENT DOCUMENTS

| DOCUMENT NO | DATE | NAME | CLASS | SUBCLASS | FILING DATE |
|---|---|---|---|---|---|
| 4,511,710 | Apr. 16, 1985 | Wang et at | 528 | 485 | Jun. 11, 1984 |
| 5,079,203 | Jan. 07, 1992 | Pinnavaia et al. | 502 | 84 | May 25, 1990 |
| 5,114,898 | May 19, 1992 | Pinnavaia et al. | 502 | 406 | Sep. 28, 1990 |
| 5,116,587 | May 26, 1992 | Pinnavaia et al. | 423 | 244 | Jan. 18, 1990 |
| 5,358,701 | Oct. 25, 1994 | Pinnavaia et al. | 423 | 242.1 | Nov. 16, 1992 |
| 5,539,135 | Jul. 23, 1996 | Breuer et al. | 554 | 167 | Apr. 04, 1991 |
| 5,765,556 | Jun. 16, 1998 | Brunson | 128 | 206.19 | Jul. 17, 1995 |
| 6,055,982 | May 02, 2000 | Brunson et al. | 128 | 206.12 | Dec. 18, 1997 |
| 6,329,515 | Dec. 11, 2001 | Choy et al. | 536 | 23.1 | Sep. 10, 1999 |
| 6,365,661 | Apr. 02, 2002 | Fischer et al. | 524 | 445 | Jan. 09, 1998 |
| 6,372,837 | Apr. 16, 2002 | Fischer et al. | 524 | 445 | Jan. 09, 1998 |
| 6,656,382 | Dec. 02, 2003 | Kuhlmann et al. | 252 | 184 | Oct. 02, 1998 |

FOREIGN PATENT DOCUMENTS

| DOCUMENT NO | DATE | COUNTRY | CLASS | SUBCLASS |
|---|---|---|---|---|
| JP 2000086694 | 28 Mar. 2000 | Japan | C07h | 21/04 |
| WO 00/09599 | 24 Feb. 2000 | PCT Application | C08K | 3/22, 7/22,9/04 |
| WO 92/17405 | 15 Oct. 1992 | PCT Application | CO1F | 7/00 |
| WO 99/17879 | 15 Apr. 1999 | PCT Application | B01J | 41/00 |

OTHER DOCUMENTS (INCLUDING AUTHOR, TITLE, DATE, PERTINENT PAGES, ETC.)

Brindly, G. W. and S. Kikkawa. 1980. Therma-behavior of hydrotalcite and of anion-exchanged forms of hydrotalcite. Clays Clay Miner. 28: 87-91.

Cavani, F., F. Trifiro and A. Vaccari. 1991. Hydrotalcite-type anionic clay: Preparation, properties and application. *Catal. Today*. 11:73301.

Cervilla, A., E. Llopis, A. Ribera, A. Corma, V. Fornes and F. Rey. 1994. Intercalation of the oxo-transfer molybdenum (VI) complex $[MoO_2\{O_2CC(S)Ph_2\}_2]^2$. into a zinc(II)-aluminium(III) layered double hydroxide host. Catalysis of the air oxidation of thiols. *J. Chem. Soc. Dalton. Trans.* 20:2953-2957.

Chibwe, M. and T. J. Pinnavaia. 1993. Stabilization of cobalt (II) phthalocyanine oxidation catalyst by intercalation in a layered double hydroxide host *J. Chem. Soc. Commun.* 278-280.

Constantino, V. R. L. and T. J. Pinnavaia. 1995. Basic properties of $Mg^{2+}{}_{1-x}Al^{3+}{}_x$ layered double hydroxides intercalated by carbonate, hydroxide, chloride, and sulfate anions. *Inorg. Chem*. 34:883-892.

Gerba, C. P. and J. B. Rose. 1990. Viruses in source and drinking water. P. 380-396. In: G. A. Mcfeters (ed), Drinking water microbiology. Spinger, N.Y.

Goswamee, R. L., P. Sengupta, K. G. Bhattacharyya and D. K. Dutta. 1998. Adsorption of Cr(VI) in layered double hydroxides. *Appl. Clay Sci.* 13:21-34.

Hermosin M. C., I. Pavlovic, M. A. Ulibarri and J. Cornejo. 1993. Trichlorophenol adsorption on layered double hydroxide: a potential sorbent. *J. Envir. Sci. Health A*28: 1875-1888.

Itaya, K., H. C. Chang and I. Uchida. 1987. Anion-exchange hydrotalcite-like-clay-modified electrodes. Inorg. Chem. 26:624-626.

Kang M. J., K. S. Chun, S. W. Rhee and Y. Do. 1999. Comparison of sorption behavior of $I^-$ and $TcO_4^-$ on Mg/Al layered double hydroxide. *Radiochim. Acta.* 85:57-63.

Kang, M. J., S. W. Rhee and H. Moon. 1996. Sorption of $MO_4^-$(M=Tc, Re) on MgAl layered double hydroxide by anion exchange. *Radiochimica Acta.* 75:169-173.

Lal, M. and Howe, A. T., "Studies of zinc-chromium hydroxy salts. II. Composite anion conductors of pressed disks of $[Zn_2Cr(OH)X.nH_2O$, Where $X^-=F^-$, $Cl^-$, $Br^-$, $I^-$, $NO_3^-$, and $1/2CO_3^{2-}$.", J. Solid State Chem (1983)

Martin, K. J. and T. J. Pinnavaia. 1986. Layered double hydroxide as suppor anionic reagent. Halide ion reactivity in $[Zn_2Cr(OH)_6]X.nH_2O$. *J. Am. Chem. Soc.* 108:541-542.

Miyata, S., 1975. The sytheses of hydrotalcite-like compounds and their structures and physico-chemical properties-I: The system $Mg_2^+$—$Al^{3+}$—$NO_3^-$, $Mg^{2+}$—$Al^{3+}$—$Cl^-$, $Mg^{2+}$—$Al^{3+}$—$ClO_4^-$, $Ni^{2+}$—$Al^{3+}$—$Cl^-$, and $Zn^{2+}$—$Al^{3+}$—$Cl^-$. *Clays Clay Miner.* 23:369-375.

Miyata, S., 1980. Physico-chemical properties of synthetic hydrotalcites in relation to composition. *Clays Clay Miner.* 28:50-55.

Miyata. S., 1983. Anion-exchange properties of hydrotacite-like compounds. *Clays Clay Miner.* 31:305-311.

Park, Y., K. Kuroda and C. Kato. 1990. Direct synthesis of intercalation compounds between a layered double hydroxide and an anionic due. *J. Chem. Soc. Dalton Trans.* 10:3071-3074.

Rhee, S. W., M. J. Kang, H. Kim and C. H. Moon. 1997. Removal of aquatic chromate ion involving rehydration reaction of calcined layered double hydroxide (Mg—Al—$CO_3$). *Environ. Tech.* 18:231-236.

Schmidt, P. C. and K. Beneke. 1988. Untersuchungen zur adsorption und stabilität von konservierungsstoffen in antacidasuspensionen. 2. Mitteilung: Reaktionskinetische stabilitätsuntersuchungen. *Pharm. Acta. Helv.* 63:188-196.

Suzuki, E., M. Okamoto and Y. Ono. 1989. Catalysis by interlayer anions of a synthetic hydrotalcite-like mineral in a halide exchange between organic halides. 1485-1486.

U.S. Environmental Protection Agency. National Primary Drinking Water Regulations: Ground Water Rule; Proposed Rules. 40 CFR Parts 141 and 142, 30 194-30274, 2000.

You, Y. W., H. T. Zhao and G. F. Vance. 2002a. Hybrid organic-inorganic derivatives of layered double hydroxides and dodecylbenzenesulfonate: Preparation and sorption characteristics. *J. Mater. Chem.* 12: 907-912

You, Y. W., H. T. Thao and G. F. Vance. 2002b. Surfactant-enhanced adsorption of organic compounds by layered double hydroxides. *Colloids Surface A.* 205: 161-172.

You, Y. W., H. T. Zhao and G. F. Vance. 2002c. Adsorption of dicamba (3,6 dichloro-2-methoxy benzoic acid) in aqueous solution by calcined-layered double hydroxide. *Applied Clay Science.* 21:217-226.

You, Y. W., G. F. Vance and H. T. Zhao. 2001a. Selenium adsorption on Mg—Al and Zn—Al layered double hydroxides. *Appl. Clay. Sci.* 20:13-25.

You, Y. W., H. T. Zhao and G. F. Vance. 2001b. Removal of arsenite from aqueous solution by anionic clays. *Enviromental Technology.* 22:1447-1457.

U.S. Provisional Application No. 60/433,548, filed Jan. 28, 2003

All patents, publications, or other references mentioned in this application for patent or listed in the above listing are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, as to all references listed or specifically mentioned, each is hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the LDH, lignan-LDH or modified LDH compositions as herein disclosed and described, ii) the related utilities, processes, or methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented.

TABLES

TABLE 1

Column Filtration of Bacteria and Viruses

| Sample No. | LDH | Organism | Starting Conc. (cfu/ml, pfu/ml) | Final Conc. (cfu/ml, pfu/ml) | Sorbed virus or *E. coli* |
|---|---|---|---|---|---|
| 1 | Mg—Al | Phix-174 | 2575 | 419 | 83.73% |
| 2 | Zn—Al | Phix-174 | 2575 | 63 | 97.55% |
| 3 | Mg—Al | MS2 | 4230 | 0 | 100.00% |

TABLE 1-continued

| Column Filtration of Bacteria and Viruses | | | | | |
|---|---|---|---|---|---|
| Sample No. | LDH | Organism | Starting Conc. (cfu/ml, pfu/ml) | Final Conc. (cfu/ml, pfu/ml) | Sorbed virus or *E. coli* |
| 4 | Zn—AL | MS2 | 4230 | 128 | 96.97% |
| 5 | Mg—Al | *E. coli* (ATCC13760) | 1235 | 0 | 100.00% |
| 6 | Zn—Al | *E. coli* (ATCC13760) | 1235 | 140 | 88.66% |
| 7 | Mg—Al | *E. coli* (ATCC15597) | 429 | 0 | 100.00% |
| 8 | Zn—Al | *E. coli* (ATCC15597) | 429 | 0 | 100.00% |

Experiment conditions: Temperature: 20° C.

Background solution: Artificial Ground Water ($CaCl_2$ 0.075 mM, $MgCl_2$ 0.082 mM, KCl 0.051 mM and $NaHCO_3$ 1.5 mM)

pH: 7.5

Sorption time: instaneously flow through

TABLE 2

| Time (min) | Percent sorbance still (series 1, 590 CFU/mL) | Percent sorbance shake (series 2, 280 CFU/mL) |
|---|---|---|
| 1 | 35 | 28 |
| 5 | 64 | 0 |
| 10 | 84 | 82 |
| 15 | 96 | 75 |
| 20 | 91 | 89 |
| 30 | 100 | 96 |
| 40 | 100 | 100 |
| 50 | 88 | 92 |

TABLE 3

| | Mg—AL LDH Sorption of Bacteria and Virus in Suspended Solutions | | | | |
|---|---|---|---|---|---|
| Initial conc. stock solution | replicate | Dilution | Count | Concentration (pfu/ml) | Ave. of Conc. (pfu/ml) |
| Phix-174 | 1 | 2 | 66 | 6600 | 5925 |
| | 2 | 2 | 63 | 6300 | |
| | 3 | 2 | 52 | 5200 | |
| | 4 | 2 | 56 | 5600 | |
| MS2 | 1 | 2 | 92 | 9200 | 9100 |
| | 2 | 2 | 87 | 8700 | |
| | 3 | 2 | 95 | 9500 | |
| | 4 | 2 | 90 | 9000 | |
| *E. coli* (ATCC 13706) | 1 | 5 | 107 | 10700000 | 16300000 |
| | 2 | 5 | 161 | 16100000 | |
| | 3 | 5 | 196 | 19600000 | |
| | 4 | 5 | 188 | 18800000 | |
| *E. coli* (ATCC 15597) | 1 | 5 | 236 | 23600000 | 26225000 |
| | 2 | 5 | 260 | 26000000 | |
| | 3 | 5 | 266 | 26600000 | |
| | 4 | 5 | 287 | 28700000 | |

TABLE 4

| Replicates | Solution Volume (ml) | LDH conc. (ppm) | Dilutions | Plate Count | Final Conc (pfu/ml) | Sorbed virus or *E. coli* (pfu) | Ave. of Sorbed virus or *E. coli* (pfu) | Adsorp Efficiency | Mass of LDH sorbed (pfu/kg) |
|---|---|---|---|---|---|---|---|---|---|
| 1 | 29 | 431 | 0 | 77 | 77 | 169592 | 169954.5 | 98.91% | 13597447.8 |
| | | | 0 | 61 | 61 | 170056 | | | |
| 2 | 29 | 431 | 0 | 49 | 49 | 170404 | | | |
| | | | 0 | 71 | 71 | 169766 | | | |
| 1 | 29 | 431 | 0 | 1 | 1 | 171796 | 171781.5 | 99.97% | 13743619.5 |
| | | | 0 | 2 | 2 | 171767 | | | |
| 2 | 29 | 431 | 0 | 1 | 1 | 171796 | | | |
| | | | 0 | 2 | 2 | 171767 | | | |
| 1 | 29 | 431 | 0 | 15 | 15 | 263465 | 263363.5 | 99.80% | 21070765.7 |
| | | | 0 | 22 | 22 | 263262 | | | |
| 2 | 29 | 431 | 0 | 11 | 11 | 263581 | | | |
| | | | 0 | 26 | 26 | 263146 | | | |
| 1 | 29 | 431 | 0 | 14 | 14 | 263494 | 263631.75 | 99.90% | 21092227.4 |
| | | | 0 | 9 | 9 | 263639 | | | |
| 2 | 29 | 431 | 0 | 8 | 8 | 263668 | | | |
| | | | 0 | 6 | 6 | 263726 | | | |
| 1 | 25 | 500 | 3 | 191 | 191000 | 395225000 | 395956250 | 99.01% | 2.7307E+10 |
| | | | 3 | 199 | 199000 | 395025000 | | | |

TABLE 4-continued

| Replicates | Solution Volume (ml) | LDH conc. (ppm) | Dilutions | Plate Count | Final Conc (pfu/ml) | Sorbed virus or *E. coli* (pfu) | Ave. of Sorbed virus or *E. coli* (pfu) | Adsorp Efficiency | Mass of LDH sorbed (pfu/kg) |
|---|---|---|---|---|---|---|---|---|---|
| 2 | 25 | 500 | 3 | 84 | 84000 | 397900000 | | | |
| | | | 3 | 173 | 173000 | 395675000 | | | |
| 1 | 25 | 500 | 3 | 160 | 160000 | 396000000 | 396093750 | 99.04% | 2.7317E+10 |
| | | | 3 | 149 | 149000 | 396275000 | | | |
| 2 | 25 | 500 | 3 | 148 | 148000 | 396300000 | | | |
| | | | 3 | 168 | 168000 | 395800000 | | | |
| 1 | 25 | 500 | 3 | 478 | 478000 | 638050000 | 641650000 | 98.73% | 4.4252E+10 |
| | | | 3 | 452 | 452000 | 638700000 | | | |
| 2 | 25 | 500 | 3 | 224 | 224000 | 644400000 | | | |
| | | | 3 | 182 | 182000 | 645450000 | | | |
| 1 | 25 | 500 | 3 | 134 | 134000 | 646650000 | 646343750 | 99.44% | 4.4575E+10 |
| | | | 3 | 149 | 149000 | 646275000 | | | |
| 2 | 25 | 500 | 3 | 146 | 146000 | 646350000 | | | |
| | | | 3 | 156 | 156000 | 646100000 | | | |

TABLE 5

5 × 10 cm LDH bag, 5 g, 10 g Mg-Al (2:1) LDH

Sep. 19, 2003 counted, Sep. 20, 2003
200 mL Laramie River water
starting bacterial solution:
94000 CFU/mL for 5 g
82000 CFU/mL for 10 g

| ref | CFUs (5 g) smear, 93, 95 | 10 g smear, 79, 85 |
|---|---|---|
| 30 | 374 | 210 |
| 30 | 481 | 228 |
| 30 | 427 | 168 |
| average CFU/MI | 4273 | 2020 |

| Time (min) | Percent sorbance 5 g | 10 g |
|---|---|---|
| 30 | 95 | 97 |

TABLE 6

Mg—Al (2:1) LDH bag test (1 g LDH in 250 mL sterile tap water with *Pseudomonas aeruginosa*)

| Time (min) | Percent sorbance of bacteria still (original concentration 590 CFU/mL) | shake (original concentration 280 CFU/mL) |
|---|---|---|
| 1 | 35 | 28 |
| 5 | 64 | 0 |
| 10 | 84 | 82 |
| 15 | 96 | 75 |
| 20 | 91 | 89 |
| 30 | 100 | 96 |
| 40 | 100 | 100 |

TABLE 7

Mg—Al (2:1) LDH bag test (1 g LDH in 500 mL sterile tap water with *Pseudomonas aeruginosa*)

| Time (min) | Percent sorbance of bacteria A (original concentration 20 CFU/mL) | B (original concentration 30 CFU/mL) | C (original concentration 40 CFU/mL) |
|---|---|---|---|
| 10 | 100 | 100 | 100 |
| 30 | 100 | 0 | 75 |

TABLE 7-continued

Mg—Al (2:1) LDH bag test (1 g LDH in 500 mL sterile tap water with *Pseudomonas aeruginosa*)

| Time (min) | Percent sorbance of bacteria A (original concentration 20 CFU/mL) | B (original concentration 30 CFU/mL) | C (original concentration 40 CFU/mL) |
|---|---|---|---|
| 45 | 100 | 33 | 100 |
| 60 | 100 | 100 | 100 |

TABLE 8

Mg—Al (2:1) LDH bag test (1 g, 2 g, 4 g LDH in 500 mL sterile tap water with *Pseudomonas aeruginosa*)

| Time (min) | Percent sorbance 1 g (original conc. 1560+ CFU/mL) | 2 g (original conc. 1060+ CFU/mL) | 4 g (original conc.1890+ CFU/mL) |
|---|---|---|---|
| 5 | 58 | 58 | 35 |
| 15 | 74 | 83 | 77 |
| 30 | 87 | 94 | 78 |

TABLE 9

Zn—Al (2:1) LDH bag test (1 g, 2 g, 4 g LDH in 500 mL sterile tap water with *Pseudomonas aeruginosa*)

| Time (min) | Percent sorbance 1 g (original conc. 2180+ CFU/mL) | 2 g (original conc. 1780+ CFU/mL) | 4 g (original conc. 167+ CFU/mL) |
|---|---|---|---|
| 5 | 0 | 0.56 | 0.59 |
| 15 | 0 | 57 | 24 |
| 30 | 42 | 81 | 0 |

TABLE 10

Mg-Al (2:1) LDH bag test (1.5 g LDH in 500 mL sterile tap water with *Pseudomonas aeruginosa*) starting bacterial conc. 96 CFU/mL

| Time (min) | Percent sorbance still | swirl every 6 min for 30 sec | upside down, right side up every 6 min for 30 sec |
|---|---|---|---|
| 30 | 100 | 100 | 100 |
| 30 | 93 | 100 | 100 |

What is claimed is:

1. A method of removing impurities comprising the steps of:

establishing an amount of water;

providing an unpowered charged sorbent medium;

moving at least some of said water in the vicinity of said unpowered charged sorbent medium;

electrostatically attracting an anionic biological agent to said unpowered charged sorbent medium;

electrostatically sorbing at least some of said anionic biological agent on the surface of said unpowered charged sorbent medium; and moving said water with at least some reduction of said anionic biological agent;

wherein said unpowered charged sorbent medium comprises a layered double hydroxide composition.

2. A method as described in claim 1 wherein said step of moving said water comprises the step of removing a percentage biological agent reduction amount selected from the group consisting of:

about 85% biological agent reduction about 90% biological agent reduction; and about 95% biological agent reduction.

3. A method as described in claim 1 and further comprising the steps of:

containing an amount of organic composition;

moving said water in the vicinity of said organic composition;

sorbing at least some of a non-ionic organic contaminant on said organic composition; and moving said water with at least some reduction of said non-ionic organic contaminant.

4. A method as described in claim 3 wherein said step of sorbing at least some of said non-ionic organic contaminant comprises the step of selecting said non-ionic organic contaminant from the group consisting of benzene, ethybenzene, toluene, xylenes, aromatic compounds, perchloroethene, trichloroethene and dichloroethene.

5. A method as described in claim 3 wherein said step of sorbing at least some of said non-ionic organic contaminant comprises the step of removing a percentage non-ionic organic contaminant reduction amount selected from the group consisting of:

about 70% non-ionic contaminant reduction;

about 75% non-ionic contaminant reduction;

about 80% non-ionic contaminant reduction;

about 85% non-ionic contaminant reduction; and about 90% non-ionic contaminant reduction.

6. A method as described in claim 1 and further comprising the step of removing nanostructural components.

7. A method as described in claim 1 and further comprising the steps of:

moving at least some of said water through a primary medium; and preventing at least some of a component of said water from moving through said primary medium.

8. A method of removing impurities of claim 1 wherein said step of providing said unpowered charged sorbent medium comprises the step of providing an cationic component.

9. A method of removing impurities of claim 1 wherein said step of providing said unpowered charged sorbent medium comprises the step of providing an anionic component.

10. A method of removing impurities of claim 1 wherein said step of providing said layered double hydroxide composition comprises the step of providing said layered double hydroxide composition represented by the formula:

$$[M^{II}_{1-x}M^{III}_{x}(OH)_2]^{z+}A^{n-}_{z/n}.yH_2O,$$

wherein $M^{II}$ is a bivalent cation, $M^{III}$ is a trivalent cation, and $A^{n-}$ is an anion bound in an intermediate layer.

11. A method as described in claim 10 wherein said $M^{II}$ is selected from the group consisting of $Ca^{2+}$, $Mg^{2+}$, $Zn^{2+}$, $Co^{2+}$, $Ni^{2+}$, $Cu^{2+}$ and $Mn^{2+}$.

12. A method as described in claim 10 wherein said $M^{III}$ is selected from the group consisting of $Al^{3+}$, $Cr^{3+}$, $Fe^{3+}$, $Co^{3+}$ and $Mn^{3+}$.

13. A method as described in claim 10 wherein said $A^{n-}$ is selected from the group consisting of $Cl^-$, $NO_3^-$, $ClO_4^-$, $CO_3^{2-}$ and $SO_4^{2-}$.

14. A method of removing impurities of claim 1 wherein said step of moving at least some of said water in the vicinity of said unpowered charged sorbent medium comprises the step of mechanically moving at least some of said water in the vicinity of said unpowered charged sorbent medium.

15. A method of removing impurities of claim 1 wherein said step of moving at least some of said water in the vicinity of said unpowered charged sorbent medium comprises the step of physically moving at least some of said water in the vicinity of said unpowered charged sorbent medium.

16. A method of removing impurities of claim 1 and further comprising the steps of:

containing an amount of lignin;

moving at least some of said water in the vicinity of said lignin;

attracting an cationic contaminant to said lignin;

sorbing said cationic contaminant on said lignin; and moving said water with at least some reduction of said cationic contaminant.

17. A method of removing impurities of claim 16 and further comprising the step of functionally situating said unpowered charged sorbent medium with said lignin.

18. A method of removing impurities of claim 17 wherein said step of functionally situating said unpowered charged sorbent medium with said lignin comprises the step of separately and distinctly situating said unpowered charged sorbent medium from said lignin.

19. A method of removing impurities of claim 17 wherein said step of functionally situating said unpowered charged sorbent medium with said lignin comprises the step of layering said unpowered charged sorbent medium and said lignin.

20. A method of removing impurities of claim 17 wherein said step of functionally situating said unpowered charged sorbent medium with said lignin comprises the step of chemically associating said unpowered charged sorbent medium and said lignin.

21. A method as described in claim 20 wherein said step of chemically associating said unpowered charged sorbent medium with said lignin comprises the step of selecting a chemical association from the group consisting of ionic bonds, covalent bonds, tether molecule and hydrophobic interaction.

22. A method as described in claim 16 wherein said step of containing said lignin comprises the step of containing a lignin-dominated substance.

23. A method as described in claim 16 wherein said cationic contaminant is selected from the group consisting of lead, chromium, zinc, mercury, ammonium, sodium, calcium, iron and copper.

24. A method as described in claim 16 wherein said step of moving said water with at least some reduction of said cationic contaminant comprises the step removing a percentage cationic contaminant reduction amount selected from the group consisting of:

about 80% cationic contaminant reduction;

about 85% cationic contaminant reduction;

about 90% cationic contaminant reduction; and about 95% cationic contaminant reduction.

25. A method of removing impurities of claim 1 wherein said step of establishing said water comprises the step of establishing an amount of raw water.

26. A method of removing impurities of claim 1 wherein said step of establishing said water comprises the step of establishing an amount of primarily treated water.

27. A method of removing impurities of claim 1 wherein said step of providing said unpowered charged sorbent medium comprises the step of providing a water treatment apparatus.

28. A method as described in claim 27 wherein said water treatment apparatus is selected from the group consisting of batch process containers, flow through containers, coated sand columns, columns, bags, tubes, coating support, and filters.

29. A method of removing impurities of claim 27 and further comprising the steps of:

attaching said water treatment apparatus to a plumbing system; and running water through said water treatment apparatus.

30. A method of removing impurities of claim 27 and further comprising the step of portably using said water treatment apparatus.

31. A method of removing impurities of claim 1 wherein said step of providing said unpowered charged sorbent medium comprises the step of providing a disposable semipermeable unit.

32. A method of removing impurities of claim 31 and further comprising the step of placing said disposable semipermeable unit in said water.

33. A method of removing impurities of claim 32 and further comprising the step of manually handling said disposable semipermeable unit.

34. A method as described in claim 1 wherein said biological agent is selected from the group consisting of virus, bacteria, hormone, fungi, prions, proteins, nucleic acids, MS2 virus, Phi-X 174, *Escherichia coli* strains and *Pseudomonas arugenosa*.

35. A method as described in claim 1 wherein said step of moving said water comprises the step of removing a percentage biological agent reduction amount selected from the group consisting of:

about 70% biological agent reduction;

about 75% biological agent reduction;

about 80% biological agent reduction;

about 85% biological agent reduction;

about 90% biological agent reduction;

about 95% biological agent reduction; and about 100% biological agent reduction.

36. A method as described in claim 1 and further comprising the step of removing said biological agent with reactivated layered double hydroxide composition.

37. A method of removing impurities of claim 36 wherein said step of removing said layered double hydroxide composition comprises the steps of:

calcinating said layered double hydroxide composition;

removing said biological agent from said layered double hydroxide composition; and rehydrating said calcinated layered double hydroxide composition.

38. A method as described in claim 1 and further comprising the steps of:

detecting said biological agent sorbed on said layered double hydroxide composition; and identifying said biological agent.

* * * * *